US011446897B2

(12) United States Patent
Tsai et al.

(10) Patent No.: US 11,446,897 B2
(45) Date of Patent: Sep. 20, 2022

(54) DOUBLE-DOUBLE COMPOSITE SUB-LAMINATE STRUCTURES AND METHODS FOR MANUFACTURING AND USING THE SAME

(71) Applicant: The Board of Trustees of the Leland Stanford Junior University, Stanford, CA (US)

(72) Inventors: Stephen W. Tsai, Palo Alto, CA (US); Robert Rainsberger, Pleasant Hill, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 16/500,337

(22) PCT Filed: Mar. 31, 2018

(86) PCT No.: PCT/US2018/025600
§ 371 (c)(1),
(2) Date: Oct. 2, 2019

(87) PCT Pub. No.: WO2018/187186
PCT Pub. Date: Oct. 11, 2018

(65) Prior Publication Data
US 2021/0114336 A1    Apr. 22, 2021

Related U.S. Application Data

(60) Provisional application No. 62/518,202, filed on Jun. 12, 2017, provisional application No. 62/501,957, (Continued)

(51) Int. Cl.
*B32B 5/12*   (2006.01)
*B32B 7/03*   (2019.01)
(Continued)

(52) U.S. Cl.
CPC .............. *B32B 5/12* (2013.01); *B32B 3/12* (2013.01); *B32B 5/26* (2013.01); *B32B 7/03* (2019.01);
(Continued)

(58) Field of Classification Search
CPC .... B32B 5/12; B32B 5/26; B32B 7/03; B32B 3/12; B32B 2262/106; B32B 2605/18
See application file for complete search history.

(56) References Cited

U.S. PATENT DOCUMENTS 5,429,845 A    7/1995  Newhouse et al.
5,476,189 A   12/1995  Duvall et al.
(Continued)

FOREIGN PATENT DOCUMENTS

EP    2772351 A1    9/2014
EP    2663450 B1    7/2018

OTHER PUBLICATIONS

International Searching Authority, International Search Report and Written Opinion for International Application No. PCT/US2018/025600, dated Jul. 17, 2018, (13 pages), The Netherlands.
(Continued)

*Primary Examiner* — Catherine A. Simone
(74) *Attorney, Agent, or Firm* — Alston & Bird LLP

(57) ABSTRACT

Disclosed is a sub-laminate module for use in forming a composite laminate structure. The sub-laminate module comprises: a first ply set containing a first ply layer oriented at a first angle and a second ply layer oriented at a second angle, the second angle being equal and opposite the first angle; a second ply set containing a third ply layer oriented at a third angle and a fourth ply layer oriented at a fourth angle, the fourth angle being equal and opposite the third angle; and an acute angle defined by a difference between the first angle and the third angle, wherein the second ply
(Continued)

DOUBLE HELIX I/GRID STRUCTURE layer is positioned adjacent the third ply layer and the second and third ply layers are both positioned intermediate the first and fourth ply layers, so as to define a double-double helix arrangement. Associated composite laminate structures and methods are also disclosed.

20 Claims, 25 Drawing Sheets

Related U.S. Application Data filed on May 5, 2017, provisional application No. 62/481,302, filed on Apr. 4, 2017.

(51) Int. Cl.
*B32B 3/12* (2006.01)
*B32B 5/26* (2006.01)

(52) U.S. Cl.
CPC ..... *B32B 2262/106* (2013.01); *B32B 2605/18* (2013.01)

(56) References Cited

U.S. PATENT DOCUMENTS

| 2006/0093802 | A1  | 5/2006 | Tsai et al. | |
|---|---|---|---|---|
| 2012/0177872 | A1* | 7/2012 | Tsai | B32B 5/12 |
| | | | | 428/113 |
| 2014/0170371 | A1* | 6/2014 | Kamiya | B29C 70/222 |
| | | | | 428/113 |
| 2015/0030805 | A1  | 1/2015 | Tsai et al. | |

OTHER PUBLICATIONS

Khot, N.S. *On the Influence of Initial Geometric Imperfections on the Buckling and Postbuckling Behavior of Fiber-Reinforced Cylindrical Shells Under Uniform Axial Compression*, Technical Report AFFDL-TR-68-136, Oct. 1968, (69 pages), Air Force Flight Dynamics Laboratory Wright-Patterson Air Force Base, Ohio.

Hühne, C. et al. *Robust Design of Composite Cylindrical Shells Under Axial Compression—Simulation and Validation*, Thin-Walled Structures, Issue 46, (2008), pp. 947-962.

Chen et al., "Optimal design of composite laminates for minimizing delamination stresses by particle swarm optimization combined with FEM," Structural Engineering and Mechanics, vol. 31, No. 4, 407-421, (2009).

Zhang, et al., "Winding orientation optimization design of composite tubes based on quasi-static and dynamic experiments," Thin-Walled Structures, 127, 425-433, (2018).

An, et al., "Stacking sequence optimization and blending design of laminated composite structures," Structural and Mulitdisciplinary Optimization, published online Nov. 28, 2018, doi.org/10.1007/S00158-018-2158-1.

Akbulut, et al., "Optimum design of composit laminates for minimum thickness," Computer and Structures, 86, 1974-1982, (2008).

* cited by examiner

| $A_{11}*$ | LEGACY QUAD COLLECTION | | | | | | | | | | |
|---|---|---|---|---|---|---|---|---|---|---|---|
| 100 | 0.886 | | | | | | | | | | |
| 90 | 0.802 | 0.824 | | | | %[0]*0.886 | | | | | |
| 80 | 0.719 | 0.741 | 0.763 | | | %[90]*0.052 | | | | | |
| 70 | 0.636 | 0.658 | 0.680 | 0.702 | | %[±45]*0.274 | | | | | |
| 60 | 0.552 | 0.574 | 0.597 | 0.619 | 0.641 | | | | | | |
| 50 | 0.469 | 0.491 | 0.513 | 0.535 | 0.557 | 0.580 | | | | | |
| 40 | 0.386 | 0.408 | 0.430 | 0.452 | 0.474 | 0.496 | 0.518 | | | | |
| 30 | 0.302 | 0.324 | 0.347 | 0.369 | 0.391 | 0.413 | 0.435 | 0.457 | | | |
| 20 | 0.219 | 0.241 | 0.263 | 0.285 | 0.307 | 0.330 | 0.352 | 0.374 | 0.396 | | |
| 10 | 0.136 | 0.158 | 0.180 | 0.202 | 0.224 | 0.246 | 0.268 | 0.291 | 0.313 | 0.335 | |
| 0 | 0.052 | 0.074 | 0.097 | 0.119 | 0.141 | 0.163 | 0.185 | 0.207 | 0.229 | 0.251 | 0.274 |
| | 0 | 10 | 20 | 30 | 40 | 50 | 60 | 70 | 80 | 90 | 100 |

PERCENT [0]

DOUBLE-DOUBLE FIELD [±ψ]

| $A_{11}^*$ [±φ] | 0 | 10 | 20 | 30 | 40 | 50 | 60 | 70 | 80 | 90 |
|---|---|---|---|---|---|---|---|---|---|---|
| 0 | 0.885 | 0.861 | 0.796 | 0.708 | 0.618 | 0.546 | 0.500 | 0.477 | 0.470 | 0.469 |
| 10 | 0.861 | 0.837 | 0.772 | 0.684 | 0.594 | 0.522 | 0.476 | 0.453 | 0.446 | 0.445 |
| 20 | 0.796 | 0.772 | 0.707 | 0.618 | 0.529 | 0.457 | 0.410 | 0.388 | 0.381 | 0.380 |
| 30 | 0.708 | 0.684 | 0.618 | 0.530 | 0.441 | 0.368 | 0.322 | 0.300 | 0.293 | 0.292 |
| 40 | 0.618 | 0.594 | 0.529 | 0.441 | 0.351 | 0.279 | 0.233 | 0.210 | 0.203 | 0.202 |
| 50 | 0.546 | 0.522 | 0.457 | 0.368 | 0.279 | 0.207 | 0.160 | 0.138 | 0.131 | 0.130 |
| 60 | 0.500 | 0.476 | 0.410 | 0.322 | 0.233 | 0.160 | 0.114 | 0.092 | 0.085 | 0.084 |
| 70 | 0.477 | 0.453 | 0.388 | 0.300 | 0.210 | 0.138 | 0.092 | 0.069 | 0.062 | 0.061 |
| 80 | 0.470 | 0.446 | 0.381 | 0.293 | 0.203 | 0.131 | 0.085 | 0.062 | 0.055 | 0.054 |
| 90 | 0.469 | 0.445 | 0.380 | 0.292 | 0.202 | 0.130 | 0.084 | 0.061 | 0.054 | 0.053 |

FIG. 4D

**Universal A₁₁* of Legacy CFRP Quad**

10-PLY SUB-LAMINATE (A₁₁*)

| Row | PERCENT [0] | | | | | | | |
|---|---|---|---|---|---|---|---|---|
| | A | B | C | D | E | F | G | H |
| 353 | 80 | | 0.763 | | | | | |
| 354 | 70 | | 0.679 | 0.640 | | | | |
| 355 | 60 | | 0.596 | 0.557 | | | | |
| 356 | 50 | 0.469 | 0.513 | 0.474 | | | | |
| 357 | 40 | | 0.430 | 0.390 | 0.518 | | | |
| 358 | 30 | | 0.346 | 0.307 | 0.435 | | | |
| 359 | 20 | | 0.263 | 0.224 | 0.351 | 0.396 | | |
| 360 | 10 | | 0.180 | 0.141 | 0.268 | 0.321 | | → SQUARE SYMMETRIC |
| 361 | 0 | | 0.096 | | 0.185 | 0.229 | 0.273 | |
| 363 | | 0 | 20 | 40 | 60 | 80 | 100 | |
| 364 | | | PERCENT [±45] | | | | | |

8-PLY SUB-LAMINATE

| Row | FRACTION [0] | | | | | |
|---|---|---|---|---|---|---|
| | I | J | K | L | M | N |
| 357 | 3/4 | | 0.732 | | | |
| 358 | 5/8 | | 0.628 | | | |
| 359 | 1/2 | 0.469 | 0.524 | 0.579 | | |
| 360 | 3/8 | | 0.420 | 0.475 | 0.426 | |
| 361 | 1/4 | | 0.316 | 0.371 | 0.322 | 0.273 |
| 362 | 1/8 | | 0.212 | 0.267 | 0.218 | |
| 363 | 0 | | 0.108 | 0.163 | | |
| 364 | | 0 | 1/4 | 1/2 | 3/4 | 1 |
| 365 | | | FRACTION [±45] | | | |

6-PLY SUB-LAMINATE

| Row | FRACTION [0] | | | | |
|---|---|---|---|---|---|
| | O | P | Q | R | S | T |
| 357 | 2/3 | | | 0.681 | | |
| 358 | 1/2 | 0.469 | | 0.542 | 0.477 | |
| 359 | 1/3 | | | 0.404 | 0.338 | |
| 360 | 1/6 | | | 0.265 | 0.200 | |
| 361 | 0 | | | 0.126 | | 0.273 |
| 363 | | 0 | | 1/3 | 2/3 | 1 |
| 364 | | | | FRACTION [±45] | | |

Double-Double Replacement of Legacy CFRP Quad

8-PLY SUB-LAMINATE (A₁₁*)

| Row | PERCENT [0] | | | | | | | |
|---|---|---|---|---|---|---|---|---|
| | A | B | C | D | E | F | G | H |
| 365 | 80 | [0/90] | [1/23] | [0/37] | | | | |
| 366 | 70 | | [1/32] | [1/48] | [13/48] | | | |
| 367 | 60 | | [13/77] | [9/62] | [18/57] | | | |
| 368 | 50 | [0/90] | [0/65] | [19/70] | [26/64] | [27/50] | | → EXACT [±Φ/±Ψ] REPLACEMENT |
| 369 | 40 | | [23/90] | [28/80] | [33/72] | [32/58] | [±45] | |
| 370 | 30 | | [32/90] | [37/90] | [42/77] | [39/63] | | |
| 371 | 20 | | [42/90] | [48/90] | | | | |
| 372 | 10 | | [65/90] | | | | | |
| 373 | 0 | 0 | | | | | | |
| 374 | | 0 | 20 | 40 | 60 | 80 | 100 | |
| 375 | | | PERCENT [±45] | | | | | |

8-PLY SUB-LAMINATE (continued)

| Row | FRACTION [0] | | | | | |
|---|---|---|---|---|---|---|
| | I | J | K | L | M | N |
| 365 | 3/4 | | [9/24] | | | |
| 366 | 5/8 | | [0/37] | | | |
| 367 | 1/2 | [0/90] | [0/59] | [0/45] | | |
| 368 | 3/8 | | [15/75] | [12/57] | | |
| 369 | 1/4 | [0/90] | [27/90] | [22/68] | [23/50] | |
| 370 | 1/8 | | [37/90] | [33/78] | [30/60] | |
| 371 | 0 | | [59/90] | [45/90] | [39/66] | [±45] |
| 372 | | 0 | 1/4 | 1/2 | 3/4 | 1 |
| 373 | | | FRACTION [±45] | | | |

6-PLY SUB-LAMINATE

| Row | FRACTION [0] | | | | |
|---|---|---|---|---|---|
| | O | P | Q | R | S | T |
| 365 | 2/3 | | [2/32] | | | |
| 366 | 1/2 | [0/90] | [0/52] | | | |
| 367 | 1/3 | | [18/72] | [18/49] | | |
| 368 | 1/6 | | [32/90] | [27/63] | | |
| 369 | 0 | | [52/90] | [41/71] | [±45] | |
| 370 | | 0 | 1/3 | 2/3 | 1 | |
| 371 | | | FRACTION [±45] | | | |

FIG. 5A

| | B | C | D | E | F |
|---|---|---|---|---|---|
| 7 | MATERIAL SELECTION | | | | |
| 8 | M40J/EPOXY ▽ | RACE (GPa) | X (MPa) | X' (MPa) | EX (GPa) |
| 9 | M40J/EPOXY | 276.0 | 3550 | 1550 | 243 |

| | P | Q | R | S |
|---|---|---|---|---|
| 7 | | | | |
| 8 | FPF: FIXED STRAIN | | TENSILE | COMPR |
| 9 | | MICROSTRAIN | 4000 | 4000 |

| | B | C | D | E | F | G | H | I | J | K | L | M | N |
|---|---|---|---|---|---|---|---|---|---|---|---|---|---|
| 12 | BEST QUAD REPLACEMENT | | | | | | | | | | | | |
| 13 | | LEGACY QUAD | | | | | | BEST FIT DOUBLE-DBLE | | | | | |
| 14 | | %[±0] | 40 | <0-100> | A11 | 136.8 | | [±PHI] | 55 | A11 | 137.3 | | ERROR 0.1% |
| 15 | | %[45] | 50 | <0-100> | A66 | 35.6 | | [±PSI] | 9 | A66 | 35.3 | | 0.0% |
| 16 | | %[90] | 10 | <DEDUCT> | A22 | 67.9 | | | | A22 | 68.0 | | -0.1% |

|   | P | Q | R | S | T | U | V | W |
|---|---|---|---|---|---|---|---|---|
| 12 | BEST LAMINATE FOR [A] | | | BEST FIT DOUBLE-DOUBLE | | | | |
| 13 | GIVEN [A] | | | [±PHI] | 55 | A11 | 137.3 | ERROR |
| 14 | | A11 | 137.3 | [±PSI] | 9 | A66 | 35.3 | 0.0% |
| 15 | | A66 | 35.3 | DEDUCTED | | A22 | 68.0 | 0.0% |
| 16 | | A22 | 68 | | | | | 0.0% |

FIG. 5E (64)

SET 1: WIDE-BAND

| 1.0 | 0.0 |
| -1.0 | 0.0 |
| 0.0 | 1.0 |
| 1.0 | 0.5 |
| -1.0 | 0.0 |
| 0.0 | 0.5 |
| 0.0 | 1.0 |
| 0.0 | 0.0 |

SET 2: FUSELAGE

| 1.0 | 0.0 |
| -1.0 | 0.0 |
| 0.0 | 1.0 |
| 1.0 | 0.5 |
| -1.0 | 0.0 |
| 0.0 | 0.5 |
| 0.0 | 0.5 |
| 0.0 | 0.5 |

SET 3: WINGS, BLADES

| 1.0 | 0.0 |
| -1.0 | 0.0 |
| 0.0 | 1.0 |
| -1.0 | 0.5 |
| 0.0 | 0.5 |
| 0.0 | 0.5 |
| 1.0 | 0.5 |
| -1.0 | 0.0 |

SET 4: SHAFTS, BICYCLE

| 1.0 | 0.0 |
| -1.0 | 0.0 |
| 0.0 | 1.0 |
| 1.0 | 0.5 |
| -1.0 | 0.0 |
| 0.0 | 0.5 |
| 0.0 | 0.5 |
| 0.0 | 0.5 |

SET 0: LOAD 1 ONLY

| 1 | 0.1 |
| 1 | 0.1 |
| 1 | 0.1 |
| 1 | 0.1 |
| 1 | 0.1 |
| 1 | 0.1 |
| 1 | 0.1 |

|   | A | B | C | D | E | F | G | H | I | J | K | L | M |
|---|---|---|---|---|---|---|---|---|---|---|---|---|---|
| 1 |   |   |   | φ = +30.0 | +45 | +52.5 | +60 | +67.5 | +75 | +82.5 | +90 |   | [+30 + 67.5] |
| 2 | LOAD | sig 1 | sig 2 | sig 6 | #1 | #2 | #3 | #4 | #5 | #6 | #7 |   | LOAD FACTOR |
| 3 | 1 | 1.0 | 0.0 | 0.0 | 0.11 | 0.25 | 0.42 | 0.59 | 0.72 | 0.79 | 0.82 | 59/37 = | 1.61 |
| 4 | 2 | -1.0 | 0.0 | 0.0 | 0.14 | 0.23 | 0.31 | 0.37 | 0.40 | 0.42 | 0.43 | 37/37 = | 1.00 |
| 5 | 3 | 0.0 | 0.0 | 1.0 | 0.63 | 0.60 | 0.54 | 0.45 | 0.36 | 0.29 | 0.27 | 45/37 = | 1.23 |
| 6 | 4 | 1.0 | 0.5 | 0.0 | 0.95 | 0.84 | 0.91 | 0.94 | 0.95 | 0.95 | 0.95 | 94/37 = | 2.57 |
| 7 | 5 | 1.0 | 0.0 | 0.5 | 0.11 | 0.24 | 0.39 | 0.51 | 0.55 | 0.53 | 0.51 | 51/37 = | 1.40 |
| 8 | 6 | 0.0 | 0.5 | 1.0 | 0.19 | 0.36 | 0.47 | 0.45 | 0.37 | 0.30 | 0.28 | 45/37 = | 1.22 |
| 9 | 7 | 0.0 | 1.0 | 0.0 | 0.09 | 0.21 | 0.42 | 0.69 | 1.00 | 1.25 | 1.35 |   | 1.89 |
| 10 |   |   |   | Min R/lam | 0.09 | 0.21 | 0.31 | 0.37 | 0.36 | 0.29 | 0.27 | MAX R | |
| 11 |   |   |   |   |   |   |   |   |   |   |   | 0.37 | BEST: STRONGEST AND LIGHTEST |

FIG. 5F

| | C | D | E | F | G | H | I |
|---|---|---|---|---|---|---|---|
| 30 | | SHEET 2 | SHEET 3 | DOUBE-DOUBLE | SHEET 4 | SHEET 6 | |
| 31 | LEGACY QUAD | FPF 4000 | UNIT CIRC | | FPF 4000 | UNIT CIRC | RATIO |
| 32 | R/SMOOTH | 262 | 415 | R/SMOOTH | 257 | 438 | 106% |
| 33 | %[+0] | 20 | 40 | [±PHI] | 22.5 | 17 | |
| 34 | %[±45] | 70 | 60 | [±PSI] | 52.5 | 51 | |
| 35 | [90] | 10 | 0 | | | | |
| 36 | NUMBER | 3 | 5 | NUMBER | 3 | 5 | |
| 37 | R/NOTCHED | | 169 | R/NOTCHED | | 177 | 105% |
| 38 | SMTH/NOTD | | 2.5 | SMTH/NOTD | | 2.6 | |
| 39 | %(WT/ALUM) | | 52% | % | | 51% | |
| 40 | A11 | 103.2 | 133.6 | A11 | 117 | 121 | |
| 41 | A22 | 80.2 | 36.4 | A22 | 65 | 45 | |
| 42 | A66 | 46.3 | 36.4 | A66 | 47 | 39 | |
| 43 | A12 | 42.2 | 36.4 | A12 | 43 | 39 | |
| 44 | TRACE | 276.0 | 242.9 | TRACE | 276 | 243 | |
| 45 | OHT, MPa | | 225 | OHT, MPa | | 238 | 106% |
| 46 | OHC, MPa | | 225 | OHC, MPa | | 203 | 90% |

FIG. 5G

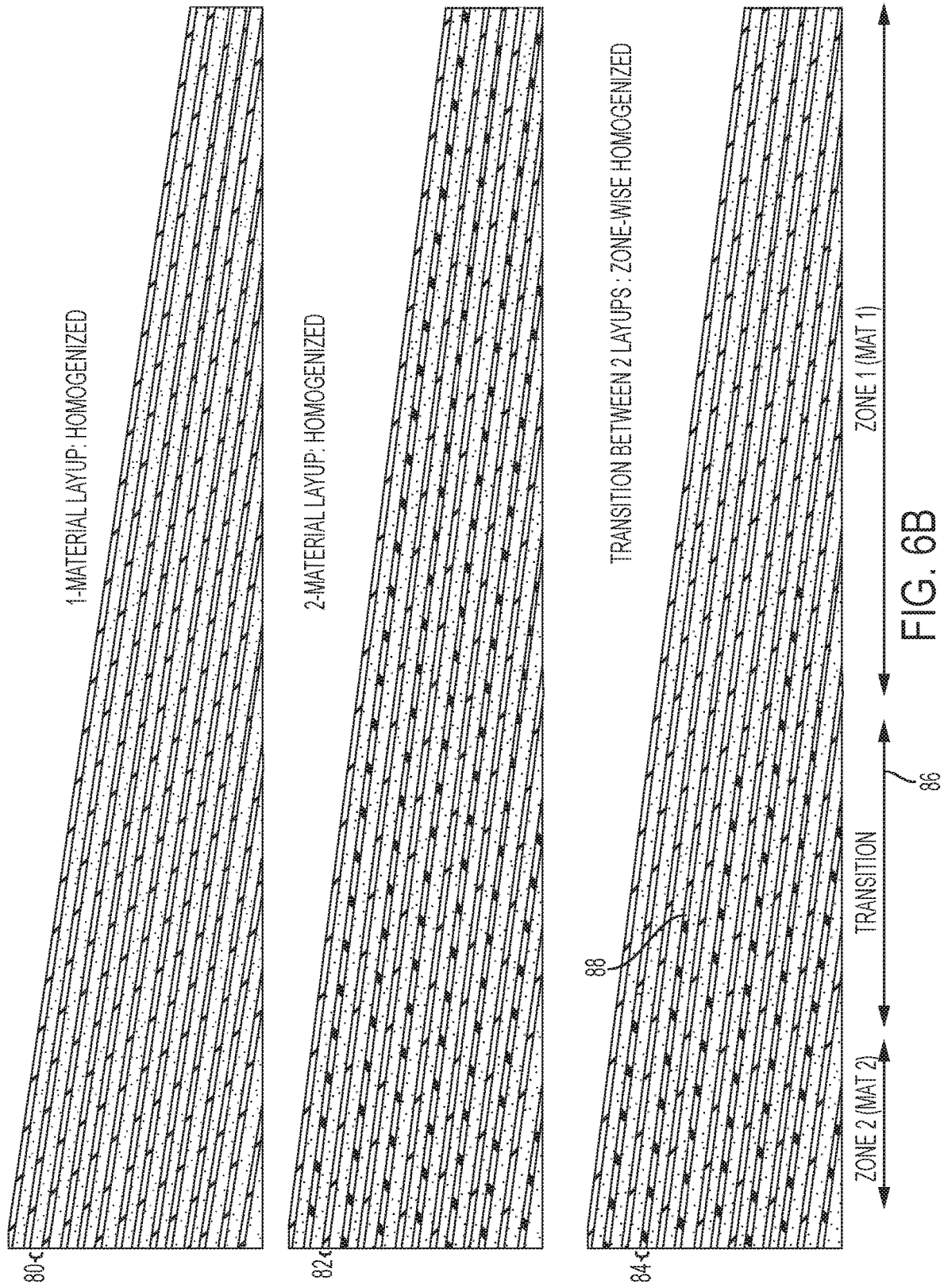

TRADITIONAL MESH

DOUBLE HELIX I/GRID STRUCTURE

DOUBLE HELIX II/SKIN PATH

DOUBLE-DOUBLE COMPOSITE SUB-LAMINATE STRUCTURES AND METHODS FOR MANUFACTURING AND USING THE SAME

This application is a National Stage Application, filed under 35 U.S.C. § 371, of International Application No. PCT/US2018/025600, filed Mar. 31, 2018, which international application claims priority to and the benefit of U.S. Provisional Patent Application Ser. Nos. 62/481,302 (filed Apr. 4, 2017); 62/501,957 (filed May 5, 2017); and 62/518,202 (filed Jun. 12, 2017), the contents of all of which as are hereby incorporated by reference in their entirety.

BACKGROUND

Technical Field

Various embodiments of the present invention relate generally to composite laminate structures, in particular those containing a pair of helical angles that define a continuous field of angles, together with methods of manufacturing, selecting, and using such structures.

Description of Related Art

Conventional composite laminate structures were generally designed to emulate the strength characteristics of conventional metal-based laminate materials and as such are constrained to designs having layers of plies that are both symmetrical and balanced. Such conventional structures, when so constrained and containing at least three ply layers formed from black carbon fibers, were commonly referred to in the art as "black aluminum" due to their combined carbon makeup and metal-emulating characteristics. Additional details surrounding conventional composite laminate structures may be understood with reference to US Publication No. 2006/0093802, the contents of which as are hereby incorporated herein by reference in their entirety.

These conventional composite laminate structures oftentimes utilized "legacy quad laminates" (as commonly referred to), which involve laminates made of collections of [0], [±45] and [90] plies (see e.g., legacy quad field 1, illustrated in FIG. 1A and detailed elsewhere herein). When one each of the three layers is stacked, the resulting structure is quasi-isotropic because it matches the isotropic properties of aluminum, which informs one of the reasons for calling such composite laminate black aluminum. The legacy quad laminates were always discrete in nature, meaning a limited number of ply angles and/or ply angle combinations (of multiple layers of the four discrete plies, as listed above) could be chosen. To have desired directional properties, more plies than the quasi-isotropic made of four plies had to be added, leading to 6, 8, 10 or more plies of sub-laminates (as detailed elsewhere herein). When laminates are made with mid-plane symmetry, resulting total laminates have doubled thickness of 12, 16, and 20 plies. If thicker laminates are needed, multiples of 12, 16, and 20 had to be considered. In extreme cases, laminates are selected based on total laminate without use of sub-laminates. In such cases, the total laminate may be selected based on the percentages of 0°, ±45° and 90° with plies dispersed across the thickness. Only explicit requirements in such cases are mid-plane symmetry, and a limit of three on ply grouping (i.e., no more than identical ply groupings can be stacked together).

The above is a unique issue with the legacy quad family of laminates. First, the sub-laminates are thick, secondly, mid-plane symmetry is required, and, lastly, huge jump in laminate thickness as thick sub-laminates are added. The huge jump can be mitigated by adding some chosen plies not part of the repeated sub-laminates. But such arbitrarily added plies, in thickness less than 6, 8, or 10 plies, differ from the properties of the sub-laminates and make optimization practically impossible. There is also an issue on minimum gauge. Many components and devices require laminate thickness less than 12, 16, and 20 plies. The use of legacy quad composites is thus not feasible in those contexts, such as for example in the realm of fuselage or wing skins. Sub-laminates of this nature were also delamination prone, and multiple failure modes resulting from thousands of fiber discontinuities and matrix cracking. Complex procedures to blend adjacent laminates with different stacking and thickness, and to drop or add plies are required for a complex structure, and impede optimization and manufacturing.

Inefficiencies arose in conventional composite laminate structures due to their discrete nature, exacerbated by self-inflicted constraints in the industry, including a perceived requirement that all composite laminate structures—and in particular the sub-laminate structures therein—have balanced and symmetric material characteristics; stated otherwise, they involve necessarily thick sub-laminate structures and mid-plane symmetry. Specifically, symmetric laminates involve a reflective or mirror-image equivalence of ply orientation about their mid-plane, while balanced laminates involve an equal number of positively (+) and negatively (−) oriented plies across their entirety. Such constraints have historically largely remained unchallenged due to concerns that conventional composite laminated structures will undesirably warp upon cool down from a curing temperature or increased residual stress when the operating temperature changes. For example, to enforce symmetry, a minimum number of plies must be doubled leading to 12, 16, and 20 plies, or higher multiples like 24, 32 and 40, and beyond. Additional details surrounding conventionally imposed constraints may be understood with reference to U.S. Pat. No. 9,296,174, the contents of which as are hereby incorporated herein by reference in their entirety.

Symmetric laminates have been traditionally formed by stacking the multiple layers of various unidirectional plies in such a manner that the composite laminate exhibits a mirror-image of itself about a mid-plane of the structure. Such lamination processes are generally time and labor intensive as well as being prone to error, requiring special attention to ensure precision ordering of the respective composite layers and may result in an unnecessary number of plies, which may contribute to excessive process waste and cost. Still further symmetric laminates have historically proven cumbersome when seeking to taper the exterior surface of a structure, due at least in part to the desire to maintain symmetry throughout, even when dropping ply layers to form the taper. In addition, as the individual or a pair of symmetric plies with substantially the same orientation is dropped to form a taper, the laminate stacking sequence and thus the material's strength characteristics, are altered.

Although not problematic on their own, balanced laminates, like symmetric ones described above, have been traditionally formed by stacking multiple layers of various unidirectional plies at a plurality of precise orientations with relatively large angles between them. For example, each off-axis ply, such as a +45° ply is typically matched (e.g., mirrored) by a −45° ply. In addition, a common practice was to have four-ply orientations incorporating angles of −45°, 0°, +45°, and 90° (i.e., the [0], [±45] and [90] configuration mentioned previously herein, simply using an alternative nomenclature). Three-ply orientations were also common, such as 0°, ±45° configurations; yet critical was that the number of positive (+) and negative (−) oriented plies remain equal.

Balanced and symmetric laminates of this nature have also traditionally created difficulty when trying to minimize laminate and even sub-laminate thickness, requiring ever thinner plies as the only option to offset the need to add 6-, 8- or 10-ply (or even more plies such as being doubled when symmetry is required) to achieve desirable material characteristics. Tapering (i.e., ply drop) complexities have also existed in these structures as well, with one exemplary limitation being that dropping of particular plies or groups thereof must not disturb the desired symmetry and balance. As a result, due to the discrete nature of available ply angles (influenced by both the extra thick sub-laminate structures and the symmetry constraints detailed herein), there were necessarily gaps between achievable laminate stiffness and/or strength characteristics that simply could not be bridged. Multiple failure modes, thousands of fiber discontinuities from ply drops and results from blending, and complexity in manufacturing were thus often faced due to self-inflicted constraints; stated otherwise, an optimal set of material characteristics in a laminate structure oftentimes had to be sacrificed to satisfy various self-imposed constraints; as a result less than optimal laminate structures were used.

Thus, a need exists to provide laminate structures and methods of manufacturing and using the same that are able to eliminate the limited field of discrete sub-laminate structures restricted due to self-imposed constraints and thus overcome the various above-mentioned material-related inefficiencies.

BRIEF SUMMARY

It will be shown that sub-laminate thickness can be kept at 4 plies (and thinner if thin plies are used) thus making across-thickness homogenization possible. Such laminates will be naturally symmetric that would allow single ply drop (instead of two at a time to maintain mid-ply symmetry), and the difficulties in blending, optimization and manufacturing will be mitigated. Laminates will be stronger and tougher, and are defined by a field of continuous variable ply angles making interpolation and extrapolation straightforward. Finally with thinner total laminates, the minimum gage requirement is reduced opening up applications for components and devices not possible with thick sub-laminates.

Various embodiments of the present invention are directed toward a sub-laminate module for use in forming a composite laminate structure. The sub-laminate module comprises: a first ply set containing a first ply layer oriented at a first angle and a second ply layer oriented at a second angle, the second angle being equal and opposite the first angle; a second ply set containing a third ply layer oriented at a third angle and a fourth ply layer oriented at a fourth angle, the fourth angle being equal and opposite the third angle; and an acute angle defined by a difference between the first angle and the third angle, wherein the second ply layer is positioned adjacent the third ply layer and the second and third ply layers are both positioned intermediate the first and fourth ply layers, so as to define a double-double helix arrangement of the respective ply layers.

Various embodiments of the present invention are also directed toward a composite laminate structure comprising: a plurality of sub-laminate modules. Each of the sub-laminate modules comprises: a first ply set containing a first ply layer oriented at a first angle and a second ply layer oriented at a second angle, the second angle being equal and opposite the first angle; and a second ply set containing a third ply layer oriented at a third angle and a fourth ply layer oriented at a fourth angle, the fourth angle being equal and opposite the third angle, the third angle being different from the first angle so as to define an acute angle there-between, the third ply layer being positioned adjacent the second ply layer and the second and third ply layers being both positioned intermediate the first and fourth ply layers so as to define a double-double helix arrangement of the respective ply layers, wherein the plurality of sub-laminate modules are sequentially stacked relative to one another so as to define a homogenized composite laminate structure.

Various embodiments of the present invention are directed toward a composite laminate structure comprising: a grid component comprising a first ply set containing a first ply layer oriented at a first angle and a second ply layer oriented at a second angle, the second angle being equal and opposite the first angle so as to define a diamond-shaped grid structure; and a skin component comprising a second ply set containing a third ply layer oriented at a third angle and a fourth ply layer oriented at a fourth angle, the fourth angle being equal and opposite the third angle, wherein the skin component and the grid component are positioned adjacent one another, such that the third and fourth angles of the skin component are both different from the first and the second angles of the grid component.

Various embodiments of the present invention are directed toward a method of manufacturing a sub-laminate module for use in forming a sub-laminate module, the method comprising the steps of: positioning a first ply set in a first orientation, the first ply set containing a first ply layer oriented at a first angle and a second ply layer oriented at a second angle, the second angle being equal and opposite the first angle; positioning a second ply set in a second orientation different from the first orientation, the second ply set containing a third ply layer oriented at a third angle and a fourth ply layer oriented at a fourth angle, the fourth angle being equal and opposite the third angle, a difference between the third angle and the first angle defining an acute angle there-between; and stacking the second ply set adjacent the first ply set so as to define a double-double helix arrangement of the respective layers, wherein, when stacked, the second ply layer is positioned adjacent the third ply layer and the second and third ply layers are both positioned intermediate the first and fourth ply layers.

Various embodiments of the present invention are directed toward a method of manufacturing a composite laminate structure, said method comprising the steps of: stacking a plurality of sub-laminate modules relative to each other, wherein each of the plurality of sub-laminate modules comprises: a first ply set containing a first ply layer oriented at a first angle and a second ply layer oriented at a second angle, the second angle being equal and opposite the first angle; and a second ply set containing a third ply layer oriented at a third angle and a fourth ply layer oriented at a fourth angle, the fourth angle being equal and opposite the third angle, the third angle being different from the first angle so as to define an acute angle there-between, the third ply layer being positioned adjacent the second ply layer and the second and third ply layers being both positioned intermediate the first and fourth ply layers so as to define a double-double helix arrangement of the respective ply layers.

Various embodiments of the present invention are directed toward a method of manufacturing a composite laminated grid and skin containing structure, said method comprising the steps of: positioning a first ply set in a first orientation, the first ply set containing a first ply layer oriented at a first angle and a second ply layer oriented at a second angle, the second angle being equal and opposite the first angle, such that the first orientation of the first ply set defines a cross-grid component; positioning at least one second ply set in a second orientation different from the first orientation, the second ply set containing a third ply layer oriented at a third angle and a fourth ply layer oriented at a fourth angle, the fourth angle being equal and opposite the third angle, so as to define a first skin component; and stacking the first skin component adjacent a first surface of the cross-grid component such that, when stacked, the fourth ply layer is adjacent a portion of both the first and second ply layers.

BRIEF DESCRIPTION OF SEVERAL VIEWS OF THE DRAWINGS

Various embodiments of the invention will be further described in the following, in a non-limiting way with reference to the accompanying drawings. Same characters of reference are employed to indicate corresponding similar parts throughout the several figures of the drawings:

FIG. 4D shows one master-ply stiffness component of legacy quad sub-laminates within the family thereof, alongside identified replacements therefor within the double-double sub-laminate family, with the top part same as FIG. 1C;

FIGS. 5A-G show a series of search engines configured as user interfaces for determination of optimal sub-laminate angle set selections within the double-double sub-laminate family based upon a variety of input parameters;

FIG. 6B shows a series of material layups and possible double-double sub-laminate transition procedures where homogenization is also achieved;

DETAILED DESCRIPTION OF VARIOUS EMBODIMENTS

Figures 1A, 1B:
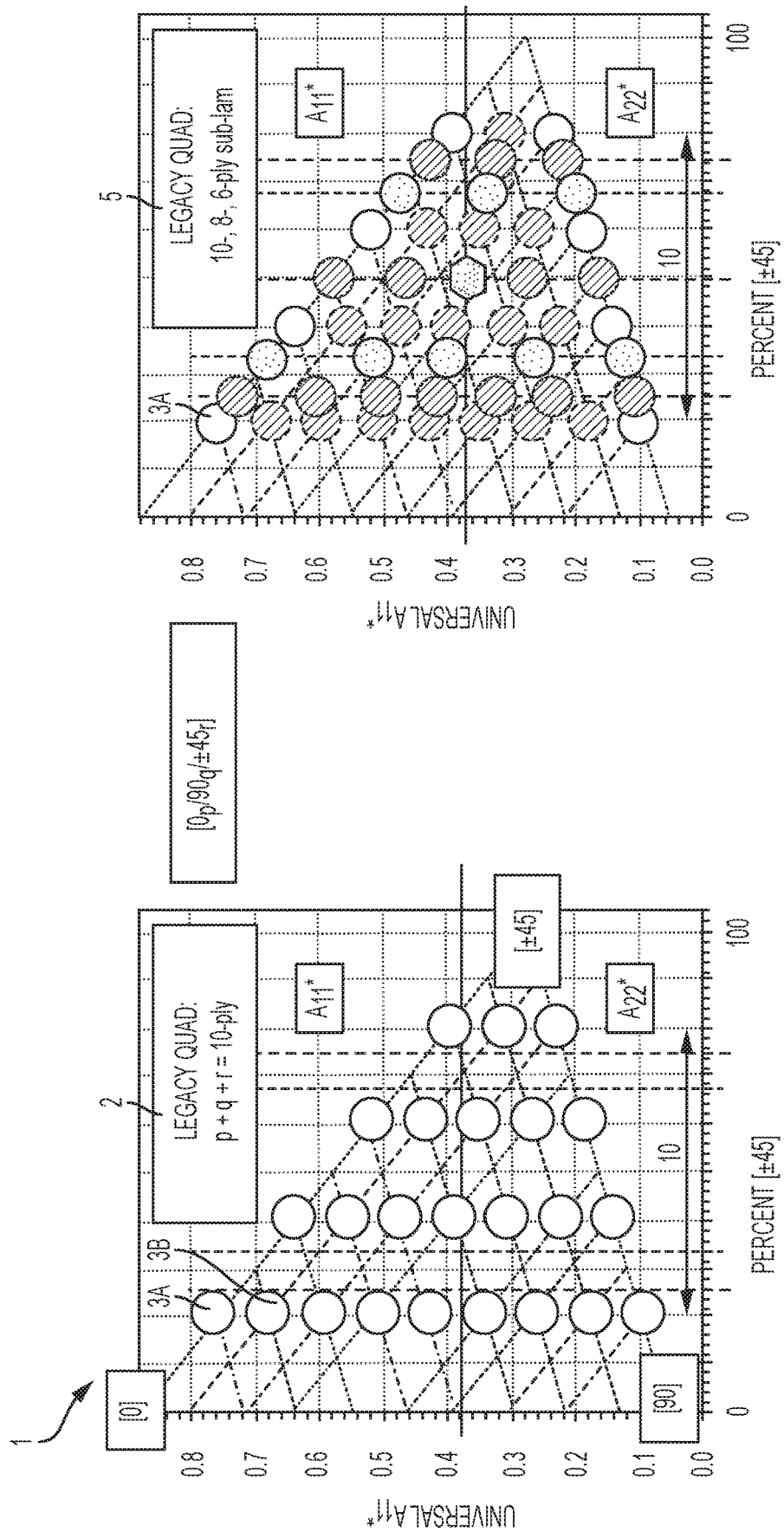
FIG. 1A shows a legacy quad conventional sub-laminate family, with focus upon a 10-ply configuration.
FIG. 1B shows the legacy quad conventional sub-laminate family of FIG. 1A, incorporating further 8- and 6-ply configurations alongside the 10-ply configuration.

To facilitate the understanding of various embodiments of the present invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Conventional Laminate Characteristics

As mentioned previously herein, conventional legacy quad laminates were made of collections of [0], [±45] and [90] ply configurations. These laminates were discrete and not possible to interpolate due to a variety of self-inflicted constraints (e.g., fixed angles, symmetry, etc.). To have more directional properties, plies had to be added to their sub-laminates, which in turn increased weight and decreased design flexibility of laminate structures due to thickness. Nevertheless, to achieve somewhat desirable material characteristics of legacy laminates, necessarily at least 6-, 8- and 10-ply thick (and oftentimes thicker) sub-laminates were utilized. When laminates with mid-plane symmetry are required and met, their thicknesses with 6- to 10-ply sub-laminates would be doubled, tripled or more. Such thick sub-laminates were, in addition to being undesirably heavy in weight, delamination prone, which also made blending, ply drop, and ply layup difficult; still further material characteristics could oftentimes not be optimized (to, for example, desired characteristics) due to limitations imposed by the discrete number of ply configurations available in the field (see field 1 illustrated in FIG. 1A). As a result, there are gaps between laminate stiffness and strength that cannot be bridged using conventional legacy quad laminates. Multiple failure modes and complexity in manufacturing thus existed.

These various considerations involved with conventional legacy quad laminates may be understood with reference again to FIG. 1A, wherein the legacy quad field 1 for a 10-ply thick sub-laminate 2 is illustrated. Once more, conventional nomenclature is utilized as $[0_p/90_q/\pm 45_r]$ to identify the sub-laminate, wherein p represents the number of 0° ply layers, q represents the number of 90° ply layers, and r represents the number of ±45° ply layers. In the specific example illustrated 10 total plies are provided. In example discrete sub-laminate 3A, the sub-laminate is formed with 80% 0° ply layers, 20%±45° ply layers and no 90° ply layers (i.e., for the 10-ply configuration illustrated, eight 0° ply layers, two ±45° ply layers and no 90° ply layers). Another discrete sub-laminate 3B is also highlighted, wherein the sub-laminate is formed with 70% 0° ply layers, 20%±45° ply layers and thus 10% 90° ply layers (i.e., for the 10-ply configuration illustrated, seven 0° ply layers, two ±45° ply layers and one 90° ply layers). As another non-limiting example, if stiffness with 80% 0°, 10% 90° ply and 10%±45° ply is desired, the sub-laminate will have to be 20 ply thick. Remaining characteristics for the other discrete twenty-four (24) sub-laminates available (i.e., each dot or anchor in FIG. 1A) may be extrapolated from these examples.

With reference now to FIG. 1B, relative to the 10-ply legacy quad field 1 illustrated in FIG. 1A, populated therein also are the discrete sub-laminates achievable (indicated by the discrete dots or anchors shown) with not only a 10-ply sub-laminate, but also with associated 6-ply and 8-ply configurations (i.e., a combined 10-, 8-, and 6-ply configuration 5). Thus, it may be understood that—even with the 6-, 8-, and 10-ply conventional legacy quad sub-laminate structures—a total field of only forty-seven (47) laminates was achievable (see again, FIG. 1B; see also FIG. 3B). Notably, though, holes remain visible between the respective discrete sub-laminate structures (i.e., although some of the dots or anchors 6 may partially overlap one another, not all of the dots or anchors 6 fully overlap with each other and thus fill all of the visible space in the field); as a result, achieving certain desirable material characteristics remains challenging and many times simply unachievable (again, due to the various self-inflicted constraints on conventional legacy quad field sub-laminates having different thicknesses in 6 to 10-plies that make blending and ply drop so complicated).

Figures 3A, 3B:
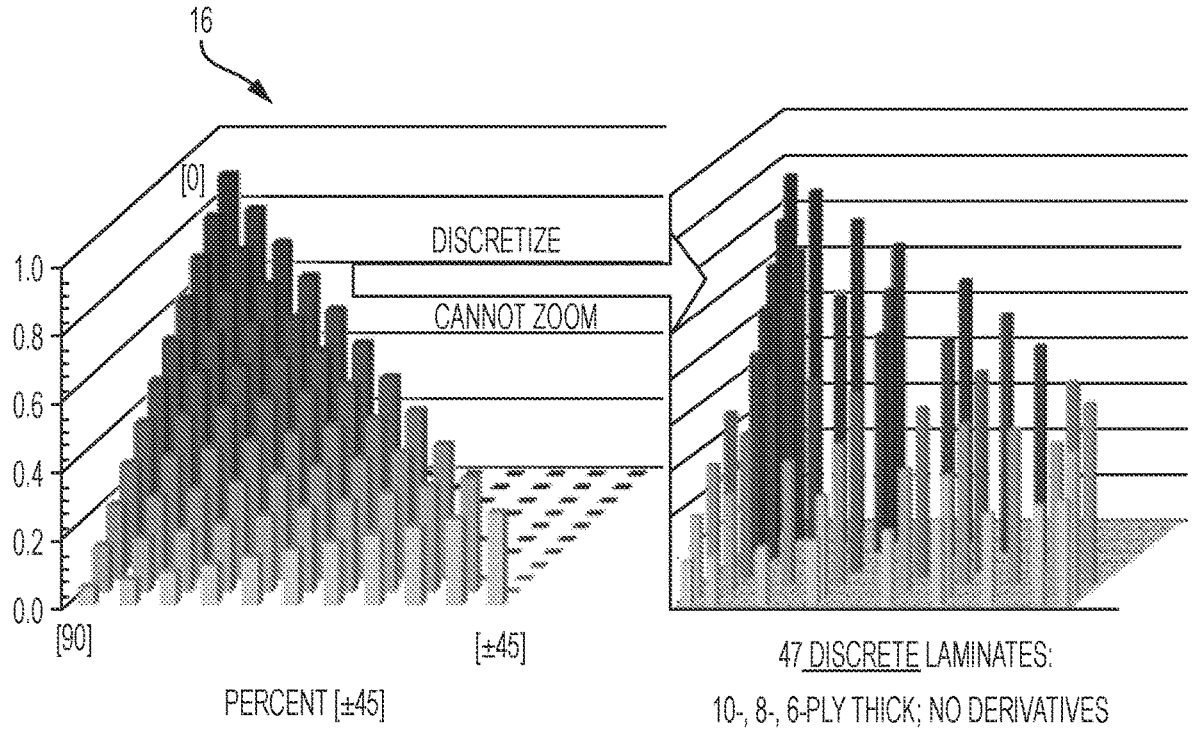
FIG. 3A shows one master-ply stiffness component of all of the 47 sub-laminates within the legacy quad conventional family of FIGS. 1A-B, similar to the illustration of a subset thereof in FIG. 1C.
FIG. 3B shows a three-dimensional representation of the legacy quad conventional sub-laminate family of FIG. 1B.

FIG. 3B provides three-dimensional and alternative views of the same discrete forty-seven (47) laminates 16 achievable via conventional legacy quad sub-laminate structures. As may be understood therefrom, as alluded to above, holes remain visible between the respective discrete sub-laminate structures that are achievable. No derivatives or continuous slopes (as will be detailed elsewhere herein) may be obtained; still further, the degree of discreteness cannot be zoomed to smaller increments, such that a continuous field may be obtained; instead, conventional legacy quad sub-laminate structures are restricted—at least in the instances of 10-, 8-, and 6-ply thick structures—to the discrete increments illustrated. Thus, to reiterate, obtaining of certain desirable material characteristics may remain challenging and many times unachievable. This may be understood also with reference to FIG. 3A and the complete chart of stiffness values for the legacy quad collection 15 illustrated therein (compare with FIG. 1C, described below and showing a subset thereof). Therein, the horizontal axis depicts percentage of ±45° plies in the laminates. As stated earlier, with the legacy quad family, many percentages cannot be achieved with 10 or less plies in the sub-laminates. The case of 10 percent ±45° will require 20 plies in the sub-laminate. Such ultra-thick sub-laminates are not practical.

Figure 1C:
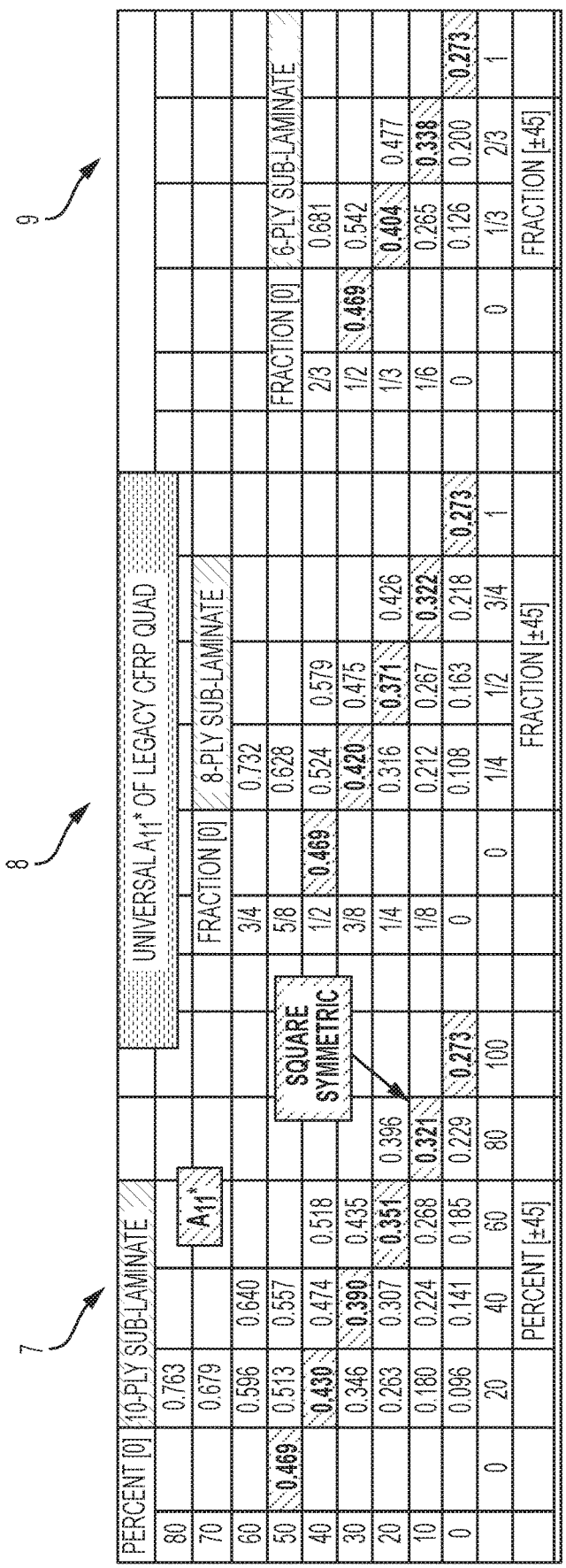
FIG. 1C shows one stiffness component of a subset of the 47 sub-laminates within the legacy quad conventional family of FIGS. 1A-B.

FIG. 1C depicts a set of three charts, namely illustrating a sub-set of the values of one stiffness component $A_{11}*$ with respect to the 10-ply sub-laminate 7 of FIG. 1A, the 8-ply sub-laminate 8 of FIG. 1B, and the 6-ply sub-laminate 9 of FIG. 1B. As may be understood from these respective charts, the sub-laminates exhibit the greatest stiffness (i.e., the highest stiffness values) where the highest percentage of 0° ply layers are used. For example, in the subset illustrated in FIG. 1C, the stiffness value (0.763) is highest for the 10-ply sub-laminate where 80% 0° ply layers are used, accompanied by 20%±45° ply layers. Another notable example, which will be returned to during discussion of FIG. 4D elsewhere herein is the stiffness value (0.321) of a "square symmetric" sub-laminate having 10-ply layers, with the "square symmetric" nomenclature accompanying 10% 0° ply layers are used, accompanied by 80%±45° ply layers representing that equal stiffness exists along both the x- and the y-axes of any so defined sub-laminate module or structure. This class of sub-laminates is particular useful, due to its having exact replacement of a legacy quad by double-double. For non-square symmetric laminates the replacement is nevertheless still an approximate match.

Reference will be made to FIG. 1C elsewhere herein (see also analogous FIG. 3A, illustrating complete collection 15 of 10-ply legacy quad configuration stiffness values—see again 0.763 stiffness value for where 80% 0° ply layers are used, accompanied by 20%±45° ply layers), by way of useful comparison to charts of stiffness values for double-double laminate structures. Via the comparison thereof, optimization opportunities via various embodiments of the present invention may be best understood. It should also be understood, from FIG. 3A, that stiffness values for the illustrated legacy quad collection may also be readily calculated using the formula of % of [0]*0.886, wherein the 0.886 represents the stiffness value when 100% [0] ply layers are used and/or the formula of % of [±45]*0.274, wherein the 0.274 represents the stiffness value when 100% [±45] ply layers are used. Notwithstanding, holes remain, such that, were a stiffness of 0.750 desired, designers would be forced—unless will to sacrifice potentially important material characteristics—to overdesign to 0.763, achieved with 80% [0] plies and 20% [±45°].

The collection 15 of FIG. 1C is also informative in terms of guidance of the laminate design without use of sub-laminates, as mentioned previously herein. As a non-limiting example the entire laminate may be designed to satisfy the percentages of the quad ranges in 0°, ±45° and 90°. Beyond the requirements of symmetry and ply grouping to larger than three (again, as mentioned previously herein), every ply stacking selection is subjective, meaning there is no scientific or mathematical analysis involved, but for having well dispersed plies that would facilitate ply drop and blending. Unfortunately, this approach often leads to multiple internal fiber discontinuities, ply wrinkling, and other defects that can be sources of multiple damage initiation sites. Double-double laminates and sub-laminate structures, in contrast, achieve structures having no internal defects, where, for example all ply drops are positioned on one of the outer surfaces (see FIG. 6B (as detailed elsewhere herein, but illustrating no internal discontinuities; ply drops occurring all on the lower edge (i.e., the outer surface)). In this context, having thin sub-laminates with constant thickness makes blending, ply drop, and manufacturing much simpler than the quad laminates in one piece or in thick sub-laminates.

Notably, though, throughout the above discussion and illustrations it should be understood that the core problem of the legacy quad laminate design is that all sub-laminates are discrete. As a result, even with utilization of 6-, 8-, and 10-ply configurations, there are no comprehensive connections among all 47 members in the sub-laminate. Thus, beyond the remaining "holes" where certain material characteristics may remain unachievable, blending between different laminates (i.e., from adjoining elements) has no standard solution. This is because there is no continuous connection between the two different laminates, for example where each laminate is a different discrete configuration. There will be thousands of fiber discontinuities inside each laminate. They are the sources of multiple failures under static and fatigue loading. Tapering is also difficult due to the lack of continuity. As a result, laminated structures using legacy quad oftentimes cannot be optimized with respect to material characteristics, and ply stacking (including tapering and blending) is extremely complicated, making automated layup procedures not only costly, but also necessarily involving compromises in material characteristics and thus structural integrity, possibly leading to multiple material failure modes that are not possible to predict (at least in part due the complexities and uncertainties involved between the discrete dots or anchors).

Figure 2A:
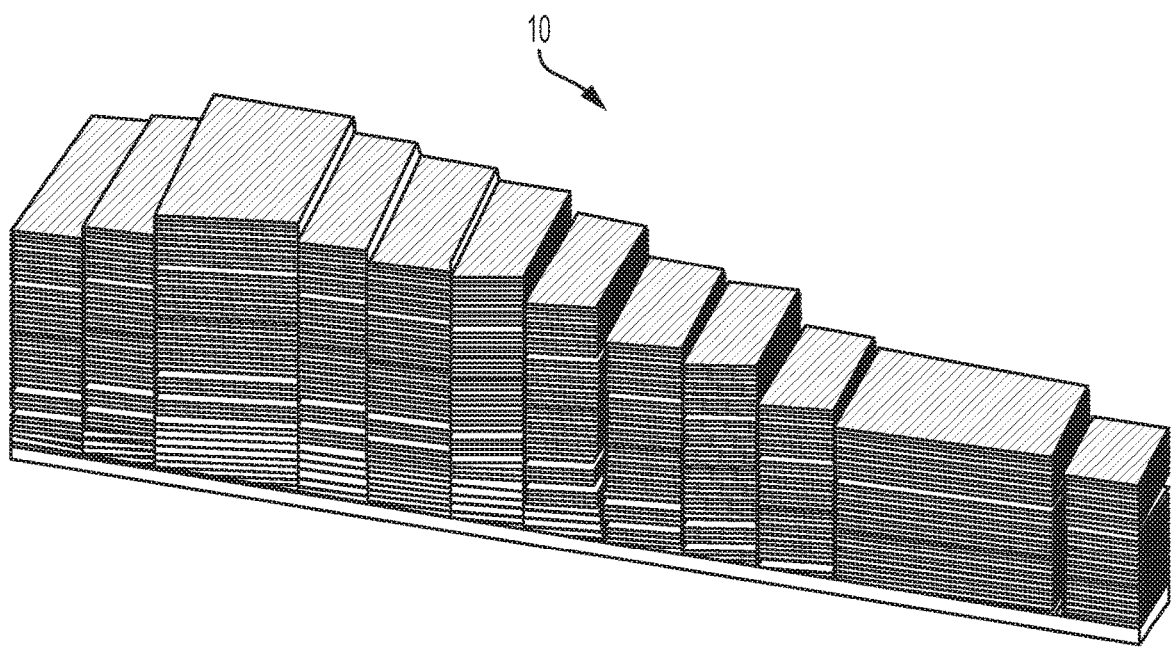
FIG. 2A shows final stacking of a wing structure according to conventional configurations.
Figure 2B:
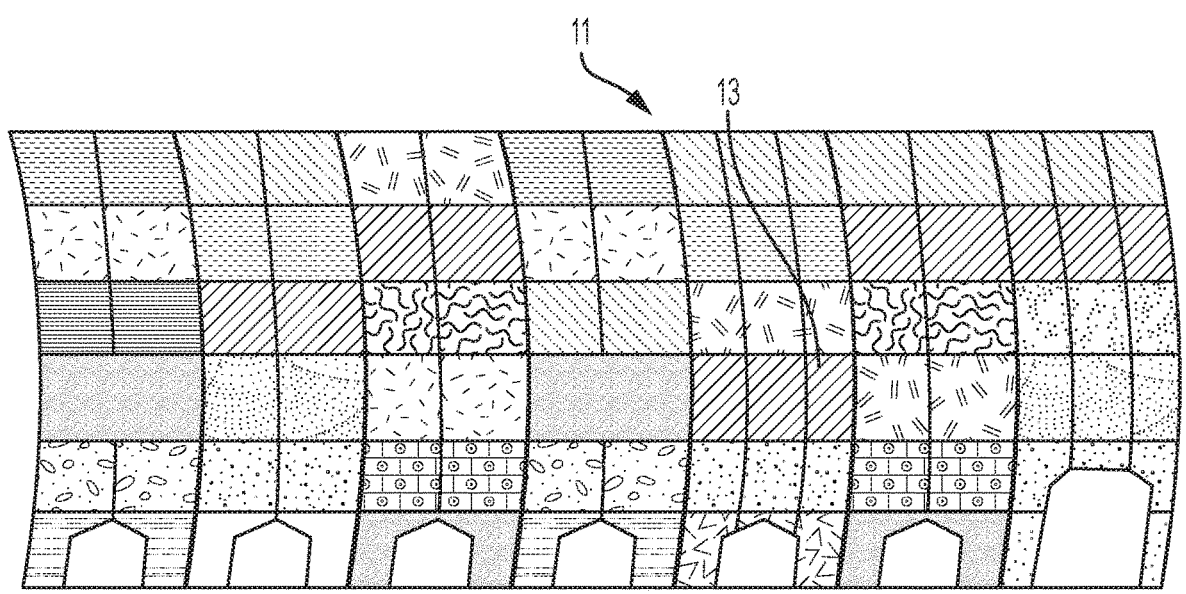
FIG. 2B shows discrete sub-laminate components or elements of a fuselage according to conventional configurations.
Figure 2C:
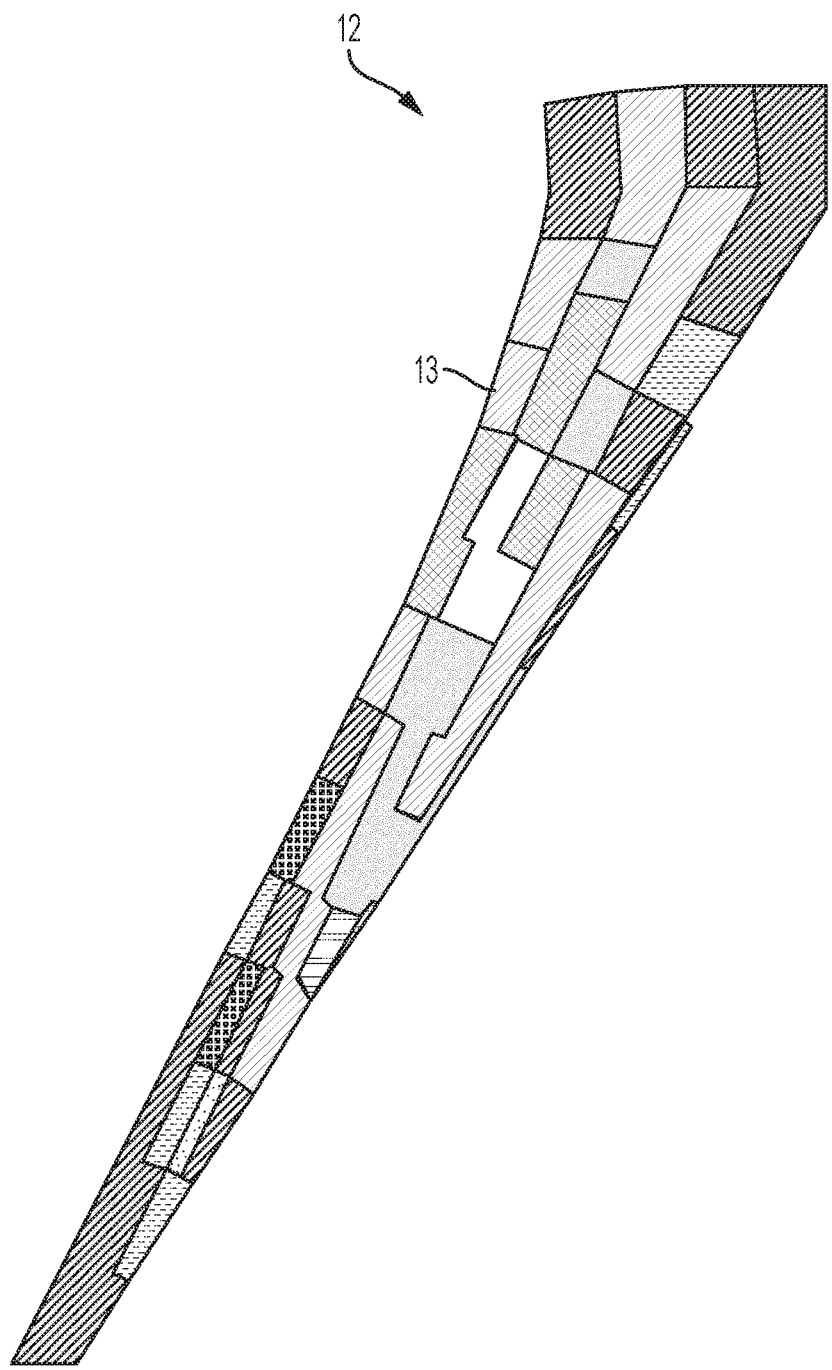
FIG. 2C shows discrete sub-laminate components or elements of a wing according to conventional configurations.

An example in this respect proves informative, with reference to FIGS. 2A-C, wherein examples of discrete elements 13 are illustrated, both in a fuselage 11 (see FIG. 2B) and a wing 12 (see FIG. 2C). According to conventional configurations, each element by itself is constructed from its own sub-laminate structure, largely so as to provide for that discrete area of the fuselage or wing desired material characteristics therefor (e.g., to maximize stiffness or the like). To blend these different and discrete elements 13 into one continuous structure (e.g., a fuselage 11 or a wing 12) is, however, a huge challenge when legacy quad laminates are used. This is, again, due to all of the laminates therein being discrete and having differing sub-laminate thicknesses (i.e., 10-, 8-, or 6-ply configurations) and also different collections of 0°, ±45°, and 90° plies, as detailed previously herein (i.e., both thickness and ply set collections are variable constraints so as to achieve the forty-seven (47) discrete options for legacy quad (see again FIGS. 1A-B; see also FIGS. 3A-B, as detailed elsewhere herein). One element may have 3 plies of 0° ply while the adjacent elements have 5 plies of 0° ply, to blend or bridge this gap is to create a transition zone of 4 plies or a big drop of 2 plies. In either case, the complexities in blending among elements make laminate weak, not optimized, and difficult to manufacture. In addition, blending conventionally also has to be done in both x- and y-direction.

Within the above example, despite and in part because of the availability of forty seven (47) discrete sub-laminate configurations, traditional optimization techniques to achieve desired stiffness, desired tapering by ply drop, desired ply angle alteration, and/or desired strength characteristics are not workable. Where tested, multiple ply angle and/or ply layer discontinuities arise, as may be understood from the final stacking 10 of discrete sub-laminates along a wing 12 (see FIG. 2C). From viewing FIGS. 2A and 2C in combination, it may be understood that a brick-like and patchy layer is the best achievable—variable in material characteristics and thicknesses alike—which as a result presents complexities oftentimes unable to be overcome, where prediction of structural strength and/or stiffness (i.e., generally material characteristics) is critical. Unknown and many potential internal failure modes exist, which modes can lead to delamination, micro-cracking, and/or fiber failure in multiple locations along a structure (i.e., a fuselage 11 or a wing 12). And unfortunately, conventional structural analysis cannot predict all of these potential failure modes or provide guidance or instructions for optimal ply drop, weight savings, and/or laying/stacking sequence. As a result, finished structures (i.e., fuselages 11 or wings 12) may be compromised structurally and not achieve—throughout—all desired design goals.

Double-Double Laminate Characteristics

The continuous field of double-double sub-laminate structures described herein according to various embodiments achieves sub-laminates with at most 4-ply thick structures; even thinner 2- and 1-ply thick configurations are obtainable. Throughout various embodiments, the ply angles are also continuous, making blending of different laminates and their optimization achievable. Sub-laminate thickness remains constant. For directional property, the angles of each double helix can change continuously to the desired values. Plies are not added like the case of legacy quad family. As a result, far fewer failure modes (and virtually no unpredictable failure modes) are encountered, and automated layup procedures may be conducted in relative simplistic fashions. All of these and still other advantages lead to much simpler and lighter structures that are also better optimized for purposes of efficiency and accuracy, notably improvements given that the further above-detailed degree of uncertainty with conventional legacy quad laminate structures is becoming ever-increasingly unacceptable across multiple industries. Having thinner sub-laminates (4 of less versus 12 to 20) the minimum gage requirement is lowered. Many electronic and medical devices can now use composite laminate. This is not possible if laminates must be multiples of 12 to 20 plies.

1. Continuous Field Versus Discrete Anchor Points

Figures 4A, 4B:
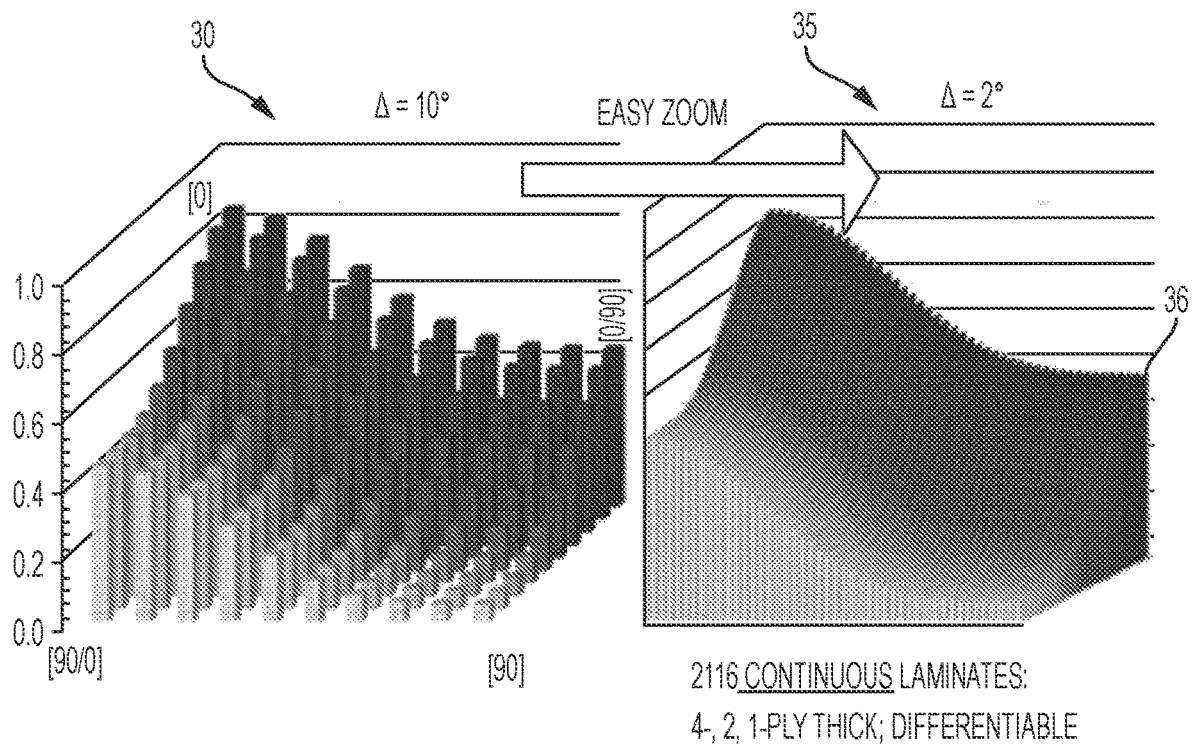
FIG. 4A shows one master-ply stiffness component of all of the sub-laminates within the double-double sub-laminate family.
FIG. 4B shows two three-dimensional representations of the double-double sub-laminate family at angle increments of 10 and 2 degrees, respectively.

Various embodiments of the present invention described herein may be generally and broadly understood with reference first to FIGS. 4A-B, by way also of comparison to FIGS. 3A-B, the latter of which as illustrate conventional legacy quad configurations. With reference now first to FIG. 4B, therein are illustrated respective fields for double-double helix laminate structures. In the left-hand chart of tabular data, there is illustrated according to various embodiments, from 0 to 90 degrees and in 10° increments, the continuous double-double sub-laminate field 30. Stated otherwise, in being continuous every value can be met; there are no holes. As may be understood, by comparison to FIG. 3B (illustrating the legacy quad laminate discrete members 16), many more options are provided and in a manner that provides a truly continuous field of variables from which to select for construction of any particular element for a structural component or the like. The "continuous" nature of this field of variables may be further understood with reference to the discussion of derivatives elsewhere herein. For example, as is well-known in calculus, only continuous functions can be differentiated. Derivatives are required in optimization procedures. Thus legacy quad cannot be optimized using established mathematic tools. In fact, with all the internal complexities it is not possible to optimize in with any tools. Design and manufacturing are ad hoc operations. No scientific foundation and hard to explain and duplicate.

In the right-hand chart of FIG. 4B, the tabular data also illustrates, from 0 to 90 degrees and in 2° increments, a further granular level of an achievable continuous double-double sub-laminate field 35. It should be understood that this field is achieved in substantially the same manner as the continuous field 30 described above and also illustrated in FIG. 4B, but for the degree of granularity in field 35 being at increments of 2° between each ply within the sub-laminate structure. The result, as illustrated, is a collection 35 (by way of non-limiting example) that includes 2,116 continuous laminates 36 that may all be utilized for forming a desired sub-laminate structure. Notably, a continuous field is provided, as compared with the limited set of discrete members 16 (i.e., the 47 members or "anchors" of FIGS. 1C and 3B). For many devices high precision in stiffness may be required. They include acoustic and high frequency situations which often require such precision.

Figure 4C:
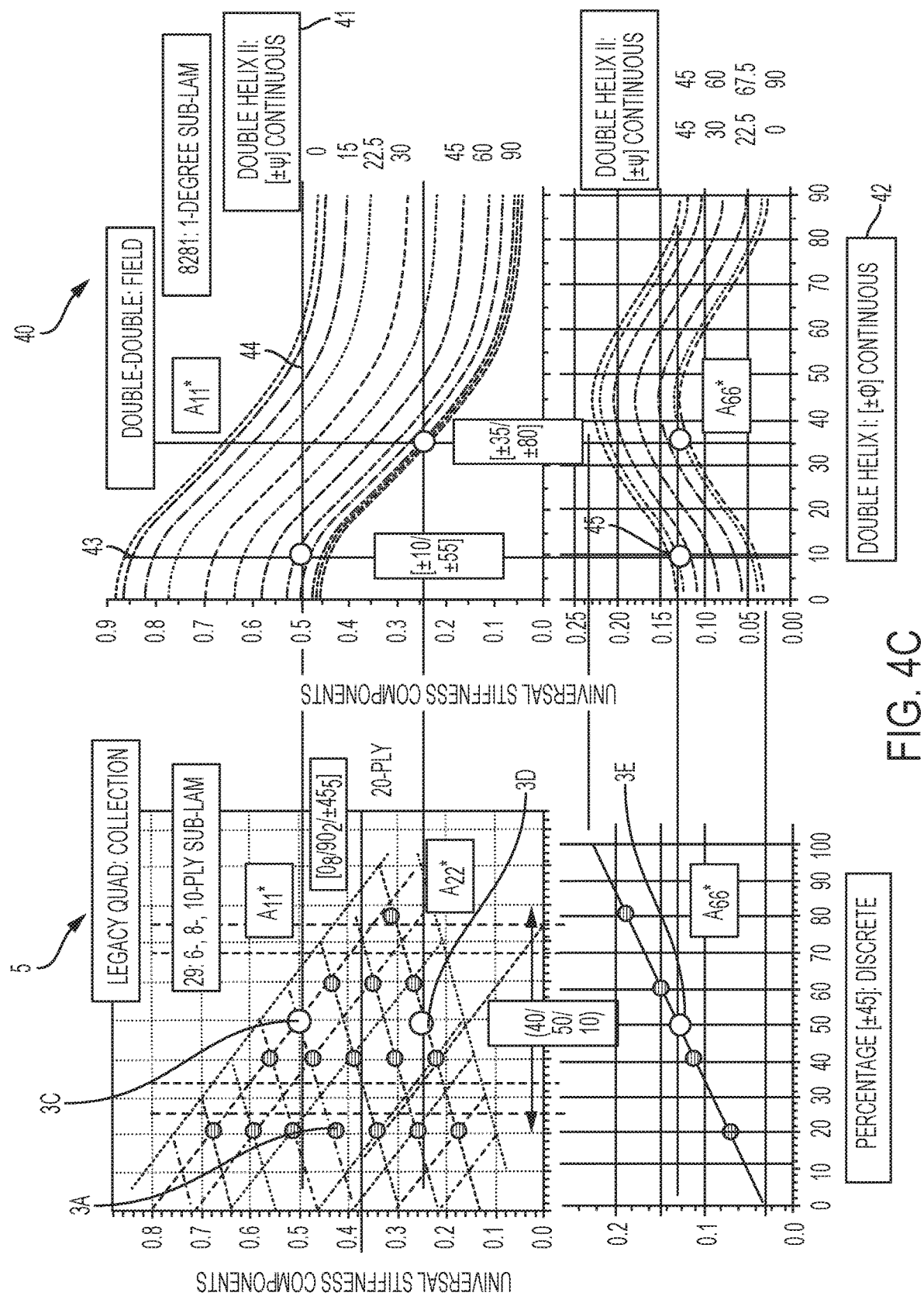
FIG. 4C shows aligned charts identifying viable replacements within the double-double sub-laminate field for anchors within the legacy quad sub-laminate field.

FIG. 4C further illustrates the manner in which the degree of granularity involved in forming each collection of continuous double-double sub-laminates is potentially indefinite, whereby here there is illustrated a continuous field 40 (see right-hand chart), produced with angle increments of 1°. This results, as illustrated in the right-hand chart of FIG. 4C in a double-double laminate field 40 that contains 8,281 sub-laminate structures from which to choose, each having distinctive material characteristics associated therewith. It should be understood that the illustrated angle increments in these figures (e.g., 10°, 2°, 1°) are non-limiting examples; in view of the derivative nature of the double-double sub-laminate field (as detailed elsewhere herein), any angle increment can be selected, depending upon the degree of granularity that may be necessary to obtain a viable stiffness or strength match (as also detailed elsewhere herein) to a conventional laminate structure and/or sub-laminate structure. In this manner, the double-double sub-laminate fields 30, 35, 40 should be understood as indicative of a continuous field of selectable ply angle and ply layer configurations, so as to best match conventional laminate structures having much greater thicknesses and/or to fill gaps of strength or stiffness values in such conventional structures due to the limited set of 47 discrete values under legacy quad-type configurations, as described previously herein.

Returning now to FIG. 4B, various advantages of the inventive double-double field 30, 35 (depending on incremental degree chosen) may be understood. First, a continuous field of laminates [±Φ/±Ψ] (see FIG. 4C as well, illustrating the discrete and independent [±Φ] 42 and [±Ψ] 41 ply angle sets) is provided for selection therefrom, as contrasted with the discrete legacy quad collections (i.e., 47 options versus double-double's 8,281+potential options). Zooming to achieve higher resolution (i.e., granularity) is conceptually easy via various embodiments of the double-double sub-laminate described herein and is shown on the right side of FIG. 4B. Equally important with granularity and this continuous field is the advantage, according to various embodiments, that the sub-laminate thickness remains constant, at most being 4-ply; 2- or 1-ply configurations are, however, also possible if folding is incorporated. Stiffness values may thus be also changed in a continuous fashion (i.e., no holes or gaps), simply by changing the angles within the continuous field, as may be understood with reference to FIG. 4A. This makes optimization possible, blending by changing one helix at a time feasible (as described elsewhere herein), and out-of-plane homogenization more easily achieved (as also described elsewhere herein). All these features—not available from the legacy quad-type structures—via the various embodiments described herein are now achievable, leading to stronger, tougher, fewer failure modes, lighter, lower cost structure, not to mention lower minimum gage, with natural mid-plane symmetry, and feasible automated layup.

Referring now also to FIG. 4A, therein is illustrated a chart of stiffness values 25 for double-double laminate structures, illustrating the continuous field provided thereby, dependent upon the ply angle values [±Φ/±Ψ] of the double-double sub-laminate. For example, a double-double sub-laminate having four total plies of [±Φ=20°/±Ψ=60°] would have a stiffness value of 0.410. Stiffness values of each possible combination in the double-double sub-laminate field (see e.g., fields 30, 35, 40 of FIGS. 4B-C) are influenced (i.e., changed) by changing the angles of each pair of plies within each angle set (i.e., two sets within each sub-laminate, as will be detailed elsewhere herein). Notably, there is always—according to various embodiments of double-double sub-laminate structures 50% of each of ±Φ and ±Ψ. For example, in the example noted above, 50% of the plies in the double-double sub-laminate are oriented at 20° while the other 50% are oriented at 60°. This provides a degree of simplicity, as compared to legacy quad members, where differing percentages of each angle must be utilized to alter stiffness values.

The above-detailed characteristics of double-double sub-laminate structures in the context of FIG. 4A may be understood by way of comparison to FIGS. 1C and 3A, both as detailed elsewhere herein. Comparative analysis of this nature may also be utilized to identify matches or replacements of conventional laminate structures with much more efficient, thinner, and the like double-double sub-laminate structures, as detailed elsewhere herein. Before turning to that comparative analysis, it is important to first understand why so much flexibility is afforded via the double-double sub-laminate fields described herein, beyond of course the sheer volume of options provided therewith. The details of this lies with the derivatives achievable via the double-double sub-laminate equations.

Indeed, one of the most compelling reasons for double-double sub-laminates as a replacement for conventional legacy quad configurations is—beyond the continuous angle options and the light-weight/low thickness characteristics described above—the simplicity of their closed-form functions and derivatives thereof, along with their inherent symmetries. Notably, numerous trigonometric functions lie behind the various configurations, both conventional and now the double-double sub-laminates. Specifically for the various embodiments of the double-double sub-laminates provided herein, though, transformation equations therefor are expressed in multiple (versus power) of ply angles, as follows:

$$\cos^4 \theta = [3 + 4\cos 2\theta + \cos 4\theta]/8, \ldots$$

In-plane stiffness components (as illustrated, by way of example, in FIGS. 4A-D) may thus be expressed as:

$$A_{11} = U_1 + U_2 \cos 2\theta + U_3 \cos 4\theta, \ldots$$

where $U_1 = \tfrac{3}{8} Q_{xx} + \tfrac{3}{8} Q_{yy} + \tfrac{1}{4} Q_{xy} + \tfrac{1}{2} Q_{ss}, \ldots$ With these trigonometric functions and associated identities, the double-double family of sub-laminate structures may be expressed as:

$$A_{11}^* = U_1^* + (U_2^*/4)[\cos 2\theta + \cos(-2\theta) + \cos 2\Psi + \cos(-2\Psi)] + (U_3^*/4)[\cos 4\Phi + \cos(-4\Phi) + \cos 4\Psi + \cos(-4\Psi)] \quad (1)$$

where $U_1^* = U_1/\text{trace} = $ universal CFRP trace normalized $U_1; \ldots$ In another identity, cosine is an even function; i.e., cos Φ=cos(−Φ)

$$A_{11}^* = U_1^* + (U_2^*/2)[\cos 2\Phi + \cos 2\Psi] + (U_3^*/2)[\cos 4\Phi + \cos 4\Psi]; \quad (2)$$

Thus, double-double sub-laminate structures exhibit a closed-form relation that is simple and easy to differentiate:

$$\frac{\partial A_{11}^*}{\partial \Phi} = -U_2^*\left[\sin 2\Phi + (\sin 2\Psi)\frac{\partial \Psi}{\partial \Phi}\right] - 2U_3^*\left[\sin 4\Phi + (\sin 4\Psi)\frac{\partial \Psi}{\partial \Phi}\right] \quad (3)$$

For any fixed value of $\Psi$, $\frac{\partial \Psi}{\partial \Phi} = 0$; i.e., $$\frac{\partial A_{11}^*}{\partial \Phi} = -U_2^*\sin 2\Phi - 2U_3^*\sin 4\Phi; \quad \frac{\partial A_{11}^*}{\partial \Psi} = -U_2^*\sin 2\Psi - 2U_3^*\sin 4\Psi$$

The symmetry in Equation (3) between the two double helix angles Φ and Ψ is important because, as a result thereof, each angle pair within the sub-laminate module [±Φ/±Ψ] operates, according to various embodiments, as an independent variable. Thus, each angle pair can be any of a continuous set of values between 0 and 90, without dependence upon the value selected for the other angle pair. This, in part, underlies the "continuous" field achievable via the double-double sub-laminate module; stated otherwise, with the ease of derivation, as detailed herein, the field would remain more discrete, such as that encountered via the legacy quad configuration.

Still further, though, for shear and transverse moduli, similar derivatives can be derived via utilization of the double-double sub-laminate module field described herein.

$$\frac{\partial A_{66}^*}{\partial \Phi} = 2U_3^*\left[\sin 4\Phi + (\sin 4\Psi)\frac{\partial \Psi}{\partial \Phi}\right] = \quad (4)$$

$$2U_3^*\sin 4\Phi \text{ if } \frac{\partial \Psi}{\partial \Phi} = 0 \text{ (any fixed value of } \Psi)$$

$$\frac{\partial A_{66}^*}{\partial \Psi} = 2U_3^*\sin 4\Psi \text{ if } \frac{\partial \Phi}{\partial \Psi} = 0 \text{ (any fixed value of } \Phi)$$

and $$\frac{\partial A_{22}^*}{\partial \Phi} = U_2^*\sin 2\Phi - 2U_3^*\sin 4\Phi; \quad \frac{\partial A_{22}^*}{\partial \Psi} = U_2^*\sin 2\Psi - 2U_3^*\sin 4\Psi \quad (5)$$

Notably, throughout, the derivatives set forth above are simple, identical, and uncoupled (i.e., the two double helix angles [±Φ/±Ψ] are always independent of each other. That single characteristic makes these derivatives in optimization, buckling, and other aero-elastic tailoring considerations much simpler than if they were coupled. There are no such counter points in legacy quad configurations. It is analogous to the modern electromagnetic field theory versus the discredited discrete aether model.

Still further, via various embodiments of the double-double sub-laminate structures detailed herein, with derivatives of trace thereof, there are only two independent derivatives. Thus, if two of the derivatives are known, the third (and any other derivative) may be determined by subtraction from the known values; no independent calculation need occur. This simplifying relation is as follows:

$$\frac{\partial(\text{trace})}{\partial \Phi} = \frac{\partial A_{11}^*}{\partial \Phi} + \frac{\partial A_{22}^*}{\partial \Phi} + 2\frac{\partial A_{66}^*}{\partial \Phi} = \quad (6)$$

$$-4U_3^*[\sin 4\Phi + \sin 2\Psi] + 4U_3^*[\sin 4\Phi + \sin 4\Psi] = 0;$$

Similarly, $\frac{\partial(\text{trace})}{\partial \Psi} = 0$

Being discrete in nature the legacy quad laminates and sub-laminate structures do not have derivatives; as a result, many optimization methods—particularly those related to the derivative functions outlined above for double-double sub-laminate structures—simply cannot be used. Double-double laminates, on the other hand, are able to simplify optimization, leading to new structures with unmatched low weight and cost. As a result, the double-double sub-laminate structure detailed herein can be formulated mathematically with many levels of symmetry and precision, thereby making it easy to—in a customizable manner—meet requirements of many applications, from heavily loaded aircraft wings to cell phone cases, as two non-limiting examples.

2. Material Characteristic Optimization and/or Matching

The customization referenced above may be perhaps best illustrated with some examples illustrating the manner in which searching for and selecting the best laminates for stiffness and/or strength for a particular application is simplified, predictable, and optimizable (i.e., no sacrifices are necessary) via various embodiments of the double-double sub-laminate structures described herein. For example, in FIG. 4C, therein is illustrated, via juxtaposition of the double-double laminate field 40 with the conventional legacy quad values 5, the manner in which certain correlations or matches may be made between the two fields. Details regarding stiffness along the x- and y-axes of any laminate or sub-laminate structure formed may be understood with reference to FIG. 4D. Each are described in turn, immediately below.

Specifically, with reference to FIG. 4C, there is illustrated on the left-hand side a chart representing twenty-nine (29) of the possible total 47 discrete anchors 3A available for utilization via legacy quad sub-laminate configurations (i.e., the legacy quad field or collection 5). The distinct 29 anchors represent 16 nodules shown in small blue circles, along with the additional nodules or anchors for 6- and 8-ply laminate structures. Highlighted in FIG. 4C is a distinct nodule or anchor 3C, which represents laminate (40/50/10), which would be constructed in its simplest legacy quad form as a $[0_8/90_2/\pm 45_5]$ sub-laminate structure. To achieve the desired characteristics, a 20-ply legacy quad configuration would be required, with eight 0° plies, two 90° plies, and five plies each of ±45° plies. Unfortunately, a 20-ply legacy quad configuration is much too thick (and thus too heavy) for many applications, particularly in aero-focused industries; thus representing another ineffectiveness of laminate from the legacy quad-like configurations. This is the same limitation of the laminates listed in FIG. 3A, many of which are not practical. Examples include sub-laminates with 10, 30, 70 and 90 percent ±45° plies.

From FIG. 4C, though, a viable replacement within the double-double sub-laminate field 40 may be predictably (via the derivatives detailed elsewhere herein) identified. Tracing across from the left-hand chart of FIG. 4C at anchor 3C, we arrive at a double-double sub-laminate 43, defined as a viable replacement with a 4-ply thick double-double sub-laminate structure, formed from pairs of angle sets as follows: [±10/±55]. This is at most 4-ply thick, although a 2-ply thick embodiment is also achievable, via a folding in half of a [10/55] configuration or a [−10/−55] configuration. Another example is understandable from FIG. 4C, whereby the legacy quad anchor 3D is replaceable with a [±35/±80]; notably, this is simply the rotated version of [±10/±55], whereby the 10 becomes 80 (i.e., 90−10) and the 55 becomes 35 (i.e., 90−55). Notably, as illustrated in FIG. 4C, differing stiffness values exist for each of these embodiments, at least due to the rotational offset between each, relative to the 0 degree orientation.

With reference to the lower portions of each of the charts in FIG. 4C, illustrated therein also (beyond the universal stiffness components in the upper portion) is a mapping of sheer, indicated by anchor 3E in the legacy quad-provided example. Notably, where a [±10/±55] comparable double-double sub-laminate is identified as having comparable stiffness characteristics, the same also provides comparable sheer characteristics. This may be understood with reference to sheer point 45. Still further, it may be understood from the respective charts of FIG. 4C that while the legacy quad collection or field 5 is limited to a discrete number of anchors (i.e., 3C-3E) from which to choose, the double-double sub-laminate field or collection 40 is continuous in nature, as evidenced by the continuous curve lines illustrated in the right-hand charts. Therefrom, any imaginable combination of [±Φ/±Ψ] may be selected for creation of a distinct 4-ply double-double sub-laminate module (or a foldable double sub-laminate module having [Φ/Ψ] or [−Φ/−Ψ] alone).

FIG. 4D is also informative in this respect, containing therein a table of respective stiffness values (in the top row of charts 50) for 10-, 8-, and 6-ply legacy quad configurations, respectively. Along the bottom are a set of three charts 55, each indicating near-match and/or exact-matches of double-double replacements that provide comparable material characteristics of corresponding legacy quad 10-, 8-, 6-ply (or even higher ply) embodiments. As a representative example mentioned previously herein where there occurs 80% [±45] and 10% 0° plies under a 10-ply legacy quad (i.e., conventional-type) sub-laminate, a square symmetric configuration is achieved, with a stiffness value of 0.321. Mapping via the derivatives detailed elsewhere herein and as illustrated in FIG. 4D, an exact [±Φ/±Ψ] replacement—having a stiffness value of 0.321 as well—is obtainable with a [±32/±58] double-double 4-ply max sub-laminate configuration. Notably, in laminates or sub-laminates other than the square symmetric example, the double-double replacements vary in degree of accuracy; however, those listed in the lower rows of the chart 55 of FIG. 4D represent those identified (via derivatives) as the best replacement. Many of those identified in chart 55 are within 1% accuracy relative to their corresponding conventional—and generally much thicker and inefficient—legacy quad sub-laminates.

Turning now to FIGS. 5A-G, additional details surrounding "search engines" configured to identify the best or optimal (or near-optimal) double-double sub-laminate replacement for a conventional legacy-type sub-laminate are illustrated and described. Generally speaking, these search engines are helpful tools to see how double-double laminates can not only replace the legacy quad laminates with exact or nearly equal stiffness and/or strength, but also provide an efficient tool for quickly and accurately identifying the best-fit double-double sub-laminates for a particular application, that are now available and beyond the capability of the conventional legacy quad family altogether. Described below are three distinct search engines, useful for designers to relate double-double to the more familiar legacy quad and beyond.

According to various search engine embodiments, a user may select material properties in trace, strength, stiffness, sheer (see chart 60 of FIG. 5A), and/or alternative or additional characteristics, such as fixed strain failure values (see chart 61 of FIG. 5B). Any of these may provide fixed inputs to the search engines, from which an optimal double-double laminate or sub-laminate structure may be identified.

Still further, it should be noted that the fixed strain failure strains that are user-defined in cells R9 and S9 of FIG. 5B may be input as alternatives to unit circle failure criterion. Various ply properties may be obtained via a pull-down menu in certain embodiments.

With reference now to FIG. 5C, there is illustrated a first exemplary search engine 62, which may be useful in identifying a double-double sub-laminate replacement for a conventional legacy quad-type laminate or sub-laminate structure. Stiffness values associated with the legacy quad appear on the left, with the "best-fit" double-double sub-laminate replacement being identified on the right, with its stiffness and the error between original and replacement values being represented as a percentage error. In the particular example populated within FIG. 5C, replacement of a legacy quad laminate defined by ply angle fractions (40/50/10) is sought. This represents 40 percent [0] ply, 50 percent [±45], and 10 percent [90], as shown in cells D14-16 in FIG. 5C. In certain embodiments, only two ply angle fractions need to be selected because the third is that remained out of 100 percent after any two fractions have been selected. The stiffness components of the exemplary legacy quad sub-laminate are calculated and shown in cells G14-16.

In this particular exemplary and non-limiting search engine of FIG. 5C, there are 2 tables for the stiffness components of $A_{11}$ and $A_{66}$. The first one is between 0 and 90 degrees, with 13 equally spaced divisions, chosen in this particular example to be at 7.5 degree increments (compare with the 10, 2, and 1 degree increments described elsewhere herein). So populated, in this particular search engine of FIG. 5C, there are 169 members within the continuous double-double sub-laminate field. This compares with legacy quad family with 10 percent increments, whereby only 47 discrete members (see anchors previously described) available for selection.

Via execution of the search engine of FIG. 5C, the closest double-double that would match the stiffness of the legacy quad can be found. This is accomplished via the second or right-hand table of FIG. 5C, which is based on the just-chosen double-double spotted at the midpoint of another 13×13 table but with 1-degree increments. With the use of these two interconnected tables, a total of 8,281 ($=14^2$) members can be reached in the laminate selection where a 1 degree angle increment is provided (see discussion elsewhere of 8,000+ member family. As a result, it may be generated (and presented to a designer) according to various embodiments, the best double-double replacement laminate, being [±55/±9], shown in cells J14-15. The stiffness components and errors are shown in cells L14-16, and N14-16, respectively.

Notably, the best quad replacement is a 4-ply or even a 2- or 1-ply configuration utilizing [±55/±9] double-double sub-laminate construction, resulting in stiffness values all within approximately 0.1% of those achievable only with a much thicker and complex legacy quad configuration. As a result, as alluded to previously herein, it is possible to find replacement (in this manner via a search engine or via direct mathematical calculation, as contained behind the user-interface of the search engine) for all members of the legacy quad family of sub-laminates. Although a combination of 7.5 and 1-degree ply angle increments are utilized via the two-tier laminate selections in FIG. 5C, it should be understood that higher resolutions may also be achieved, even at ½, ¼, or even more finite ply angle increments. It is in this manner, that the continuous nature of the double-double sub-laminate field becomes readily apparent. For example, by way of comparison, in legacy quad configurations, as seen in FIG. 1B, there is no smooth transition from one laminate to another. Not only the thickness of the sub-laminate can change between 6, 8 and 10, the ply composition cannot remain the same. One may have 4 [0] and another 6 [0]. Blending and ply drop are thus obviously great challenges for designers and manufacturers alike in the context of conventional configurations such as that of legacy quad.

Returning to FIG. 5D, therein is illustrated an additional search engine 63, which may be configured to find the best fit double-double laminate or sub-laminate to match a given set of in-plane stiffness components, as shown in GPa. This given [A] is shown in cells R14-16, where ordinarily $A_{11}$ and $A_{66}$ are input values for the search engine, while $A_{22}$ is the leftover from the trace of the ply material. In certain embodiments, the choice of independent components can be $A_{11}$ and $A_{22}$, in which case, $A_{66}$ in cell R15 will be variable, so the correct $A_{22}$ in cell R16 is found.

The best-fit double-double laminate is found in cells T14-15; i.e., $[\pm\Phi/\pm\Psi]=[\pm55/\pm9]$. The stiffness of this double-double sub-laminate is shown in cells V14-16 of FIG. 5D, whereby the errors between the desired and found [A] listed in cells W14-16 are nearly zero percent. Such accuracy can be credited to utilizing in this non-limiting example a search engine 63 with 1-degree increments across the double-double sub-laminate field. The legacy quad family of laminates are much coarser; i.e., having only 29 (or 47) as compared with over 4,000 (or over 8,000), depending upon number of plies involved. Under such circumstances, conventional legacy quad-type sub-laminates can be easily thicker than 10 plies (e.g., (45/40/15) will need 20-ply in $[0_9/\pm45_4/90_3]$, as previously described herein). Double-double sub-laminates, via execution of the search engine 63, may be readily identified and provide nearly exact match (note: one can easily change to increments less than 1 degree if a closer match is desired and/or necessary), and importantly, throughout, the double-double sub-laminates remain at most 4-ply thick.

In practical terms, matching stiffness in this manner is often useful in laminate optimization. Such matching can occur in order to control laminate behavior in buckling, to control natural frequency, and/or during aero-elastic tailoring. High resolution matching may also be required in optical and acoustic devices. Composite laminates can thus be expanded to provide unique solutions and/or structures that were either not easily obtained or not possible to obtain with conventional legacy quad sub-laminate configurations and the materials—and constraints—utilized therewith.

FIG. 5E depicts yet another search engine 64, whereby for determination of strength, associated load sets must be selected. In the particularly illustrated embodiment, five examples of load sets are shown; the first four are multiple sets up to seven loads each, and the last one, a single load. All seven loads must be filled except the Set 0, where load 1 is repeated or auto-filled for the remaining loads 2-6. Exemplary applications are thus highlighted, including for fuselage, wings, bicycle components, and the like; all non-limiting in nature of course.

With this context, reference is made to FIG. 5F and the chart 65 illustrated therein, wherefrom it may be understood that determining the thickness required of components subjected to multiple-load sets is relatively straightforward, but must follow strict rules. For each load, a certain thickness is required and the controlling load is simply the load that calls for the thickest material because all other loads call for lesser thickness. For composite laminates, the search for the laminate thickness subjected to multiple-load sets require two steps. The first step is to find the controlling load for each of the member laminates. This is shown in FIG. 5F (by way of non-limiting example) where there are seven chosen laminates listed in the top row. They happen to be beginning with [±30/±45] proceeding to [±30/±90]. There are also seven loads in this multiple-load set, listed on the left. For the first laminate [±30/±45] in column E, the lowest strength ratio is 0.09 shown in cell E9, and also E10. Notably, across the chart, for each laminate the minimum strength ratios are shown in row 10 and each of these values should be recorded.

The second step according to various embodiments and with continued reference to FIG. 5F is to find the highest strength ratio among the seven laminates; in this particular scenario, that is the laminate in column H with a ratio, R=0.37. This is determined, though, via a comparison—as in column L—to determine the load factor. Resulting calculations determine that in FIG. 5F the strongest and lightest laminate among the seven identified as possible is a four-ply double-double sub-laminate, identified with common nomenclature as [±30/±67.5]. Stated otherwise, the optimal or controlling laminate in FIG. 5F is in column H: [±30/±67.5] with an R=0.37, and the load 2 as the controlling load, wherein the load factor is minimized. For all other loads, the resulting R=values are higher, or a lighter weight or thinner laminate is used. While this procedure can be applied to legacy quad with equal effectiveness except the choices in laminates are subject to holes between them, and have the best laminate with high laminate thickness and ply compositions that are difficult for blending and manufacturing. Double-double, on the other hand, remains simple to blend because there are only 4 ply angles with equal thickness in the sub-laminate.

Remaining with FIG. 5F, it may be understood from column M that the strength ratio for each load for the best laminate (column H) is divided by the controlling load at 0.37 of load 2. For the first load it is 0.59/0.37=1.61; the second load is unity for the controlling load; the third, 1.23; these are commonly referred to as ratios load factors and represent the gap between any of the multiple loads to that of the controlling load. As a non-limiting example, with the first load, the factor 1.61 means that the load can be increased by this factor and it will be the same as the controlling load for [±30/±67.5]. For load 2, this factor is unity, which means that it is the controlling load and cannot be increased without increasing the thickness of the laminate or without reducing a safety factor or a strength ratio.

In the search engine 66 of FIG. 5G, both legacy quad sub-laminate data and double-double sub-laminate family data are included. As detailed elsewhere herein, the quad family is discrete and cannot be interpolated and differentiated, while the double-double family achieves a continuous field and can have any degree of precision with respect to both interpolation and differentiation. In fact, two levels of precision are available in this particular exemplary (and non-limiting search engine: the first is based on 7.5 degree angle increments with 169 members (as previously detailed herein); and the second is higher resolution with 1 degree increments with 4086 members (as also previously detailed herein). Of course, still further higher resolution (even to <1 degree increments) may be utilized, as may be desirable for certain applications requiring a high degree of accuracy and/or having a low degree of tolerance.

Remaining with FIG. 5G, for particularly desired strength characteristics, to the left is illustrated the best laminate available from the legacy quad family, with reference to Sheets 2-3. The best laminate from the double-double family is shown to the right, with reference to Sheets 4 and 6. For each laminate family illustrated in FIG. 5G, two failure criteria are shown: the fixed strain failure (FPF) based on intact stiffness; and the unit circle failure criterion based on degraded stiffness (with micro cracks, for example). These two criteria are shown in Sheets 2 and 3, respectively for the legacy quad, and Sheets 4 and 6 for double-double families. The fixed failure strains (FPF 4000) can be changed from 4,000 to any value elsewhere within the search module, if desirable. The unit circle failure criteria are defined by the uniaxial tensile and compressive failure strain; i.e., $X/E_x$, and $X'/E_x$, respectively, where the longitudinal stiffness $E_x=0.880 \times$Trace.

The output data in the first row of FIG. 5G (i.e., row 32) includes the strength ratio for each laminate based on smooth test coupons (no notch). Since unit stress vectors are the input, the resulting strength ratio is the ultimate strength. As a non-limiting example, it may be seen from this figure that the values for different laminates and failure criteria are 262 and 415 MPa for legacy quad, and 257 and 438 MPa for double-double. These are working stresses that each laminate under each failure criterion can reach. Note the ratios between 415/262=1.58 and 438/257=1.70 are the knockdown factors between the unit circle over fixed strain criterion. Also note that double-double strength over legacy quad is 438/415=1.06 (shown in cell R32), or six (6) percent stronger.

The next three rows in FIG. 5G are the description of the chosen laminates. For the legacy quad, the laminates are shown in cells D33-35 with ply percentages (20/70/10) for the fixed strain criterion; and cells E33-35 in (40/60/0) for the unit circle criterion. For the double-double laminates the best laminates are (±22.5/±52.5) for the fixed strain; (±17/±51) for the unit circle. The controlling loads are shown in row 36 and they vary depending on the laminates and the failure criterion. Again, the search for legacy quad may not lead to practical laminates. Examples, cited earlier, include those with 110, 30, 70 and 90 percent ±45*plies. They would require sub-laminate thickness 20 plies, when with mid-plane symmetry, the laminate would be a minimum of 40 plies.

Strength ratio for notched laminates are shown in row 37, under combined stresses and multiple load sets. They are quite different from the OHT and OHC normally measured under uniaxial load. In fact, the strength of these special cases are shown in rows 45 and 46. They are the best among their families of 169 or 8,100 laminates, respectively (legacy quad versus double-double), but are limited—in the analysis provided via the search engine of FIG. 5G to uniaxial loading only. Stated otherwise, the values represented do not reflect their strength under multiple, combined stresses as those in row 37 represent. Throughout, though, it may generally be seen that comparable—and in certain instances—better performing double-double sub-laminates are identifiable strength-wise, notwithstanding of course additional advantages described elsewhere herein (i.e., thickness, weight, tapering, etc.).

Various laminate structure (e.g., ply layers and/or sub-laminate modules) consolidation options exist as well, as are commonly known and understood in the art. Fabrics within the ply layers and/or the sub-laminate modules may be furnished as dry fibers or pre-impregnated with resin (e.g., prepreg). Non-limiting examples of each, as also commonly known and understood in the art, include the non-limiting examples of Resin Transfer Molding, Vacuum Resin Transfer Molding, Heated Vacuum Assist Resin Transfer Molding, out of Autoclave Processes, and Resin Film Infusion. In certain embodiments, the plies may be carbon fiber plies defined by or formed from a plurality of fibers. Still other embodiments may be alternatively configured with various materials (e.g., fiberglass or an electric conductor such as copper wire). As a non-limiting example, in the context of wind turbine blades, the laminate structures and/or sub-modules described herein may, instead of carbon fiber plies, incorporate fiberglass plies, as may be desirable for cost or other considerations, as the case may be. In still other embodiments, hybridization may be desirable, leading to a mixture of any of variety of combinations of carbon fiber, fiberglass, and/or periodically spaced electric conductor (e.g., copper wire, as lightning protection), or still other materials as ply layers.

Described elsewhere herein are grid and skin-based structures, wherein the grid is defined by one double helix and the skin is defined by another double helix. In that context, for determination of strength, stiffness, and/or other material characteristics of the sub-laminate and any resulting laminate structures, two additional factors must also be considered. First is the volume fraction of the ribs, whereby as a non-limiting example a dense grid will be defined by a ratio of 50 percent, as compared to a sparse grid defined at 20 percent); differing ply orientations and the like may be utilized for a dense versus sparse grid, so as to obtain particularly desirable material characteristics. Second is the percentage thickness of the grid to the total thickness of any skin/grid laminate structure formed therefrom. When there is no skin, this factor 1, when there is no grid, it is 0. The various search engines described herein operate based upon the premise that the grid can be represented by a smeared body like a ply.

3. Homogenization, Tapering, and Blending

Homogenization, from a practical perspective, means that a laminate structure's structural strength characteristics, among other properties, may be predicted, manipulated, and calculated with regard to the laminate structure as a whole. Stated otherwise, homogenized structures are not only a simpler physical entity, but also easier to manipulate mathematically. In contrast, for heterogeneous structures, material characteristics must be managed (i.e., predicted, manipulated, and/or calculated) greater care and complexity.

For example, having thick sub-laminates and varied ply composition forced the legacy quad into a heterogeneous structure. Homogenization by having multiple stacking of sub-laminates makes the laminate even thicker. Problems of blending, ply drop, thousands of fiber discontinuity, multiple failure modes, lack of optimization all have conventionally made composites more expensive to design and manufacture. Confidence and reliability are as a result low, and design takes longer and is more study-intensive. Additional details in this respect may be understood with reference to U.S. Pat. No. 9,296,174, as previously cited herein and as incorporated by reference herein in its entirety.

For double-double sub-laminate configurations, however, homogenization is easy to achieve because the sub-laminate is thinner, and ply angles as design variables are continuous (i.e., may be selected from a continuous field, as detailed elsewhere herein). Blending and ply drop are straightforward procedures, while internal fiber discontinuities are limited to transition zones between different sub-laminate zones (as also described elsewhere herein). Stated otherwise, there are no discontinuities within each zone; instead, within each zone or element, all ply drops can be located on one of the outer surfaces. As a result, no fiber discontinuities exist in the interior of a double-double sub-laminate structure. Failure modes are thereby limited and more easily described and tracked, leading to heightened confidence and reliability, along with straightforward manufacturing procedures.

Figure 6A:
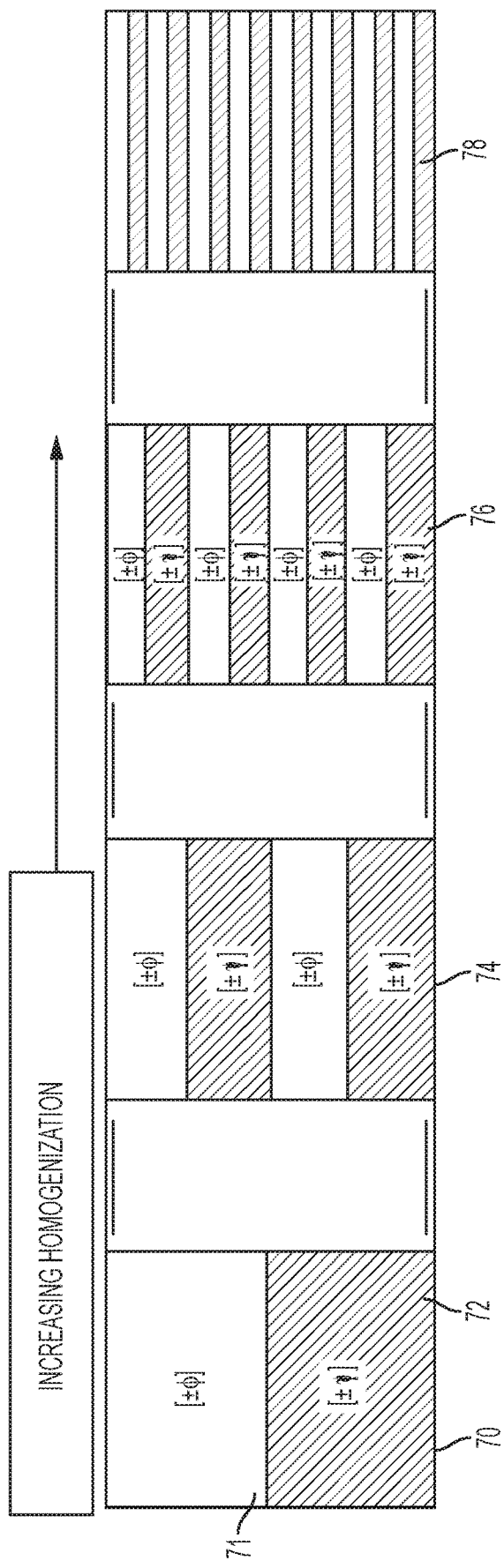
FIG. 6A shows a series of sequentially stacked double-double sub-laminate modules leading to a homogenized total laminate structure at the far-right.

Remaining in the context of double-double sub-laminate structures as described herein, homogenization thereof may be further understood with reference to FIGS. 6A-B. First, in FIG. 6A, there is illustrated from left to right embodiments of double-double sub-laminates having ply angle sets of [±Φ/±Ψ] as detailed elsewhere herein. On the far-left is a single double-double sub-laminate structure 70, which essentially forms a basic building block, from which homogenized laminate structures may be formed (i.e., from sequential stacking of multiple sub-laminate structures 70. Each sub-laminate structure 70 contains a pair of [±Φ/±Ψ] ply layers, namely [±Φ] 71 and [±Ψ] 72.

The sequential stacking of respective building blocks or sub-laminate structures 70 maybe understood from viewing FIG. 6A from left to right, wherein the structure 74 contains two building blocks of [±Φ/±Ψ], the structure 76 includes four building blocks of [±Φ/±Ψ], and the structure 78 includes eight building blocks of [±Φ/±Ψ] double-double sub-laminate. Generally speaking, it is considered good practice to have a total laminate consisting of stacking of the same sub-laminate, as illustrated in FIG. 6A. Still further, homogenization across the thickness of the total laminate is more easily achieved if the sub-laminate is thin, as illustrated. Eight repeats, as shown in the structure 78 is generally considered homogenized.

Figure 6C:
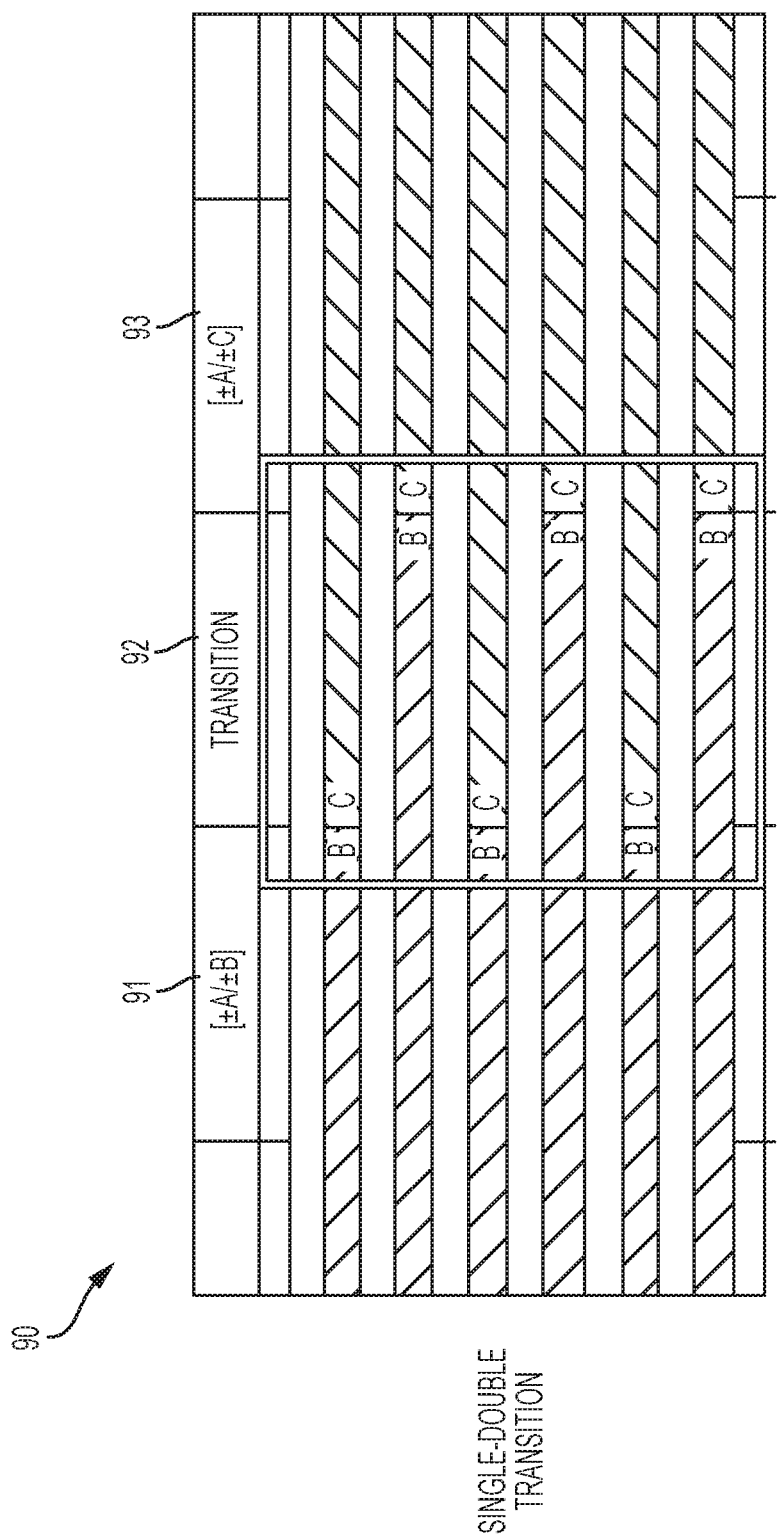
FIG. 6C shows a single-double transition from one double-double sub-laminate to another, whereby only a single angle within the angle set is changed at any particular location.
Figure 6D:
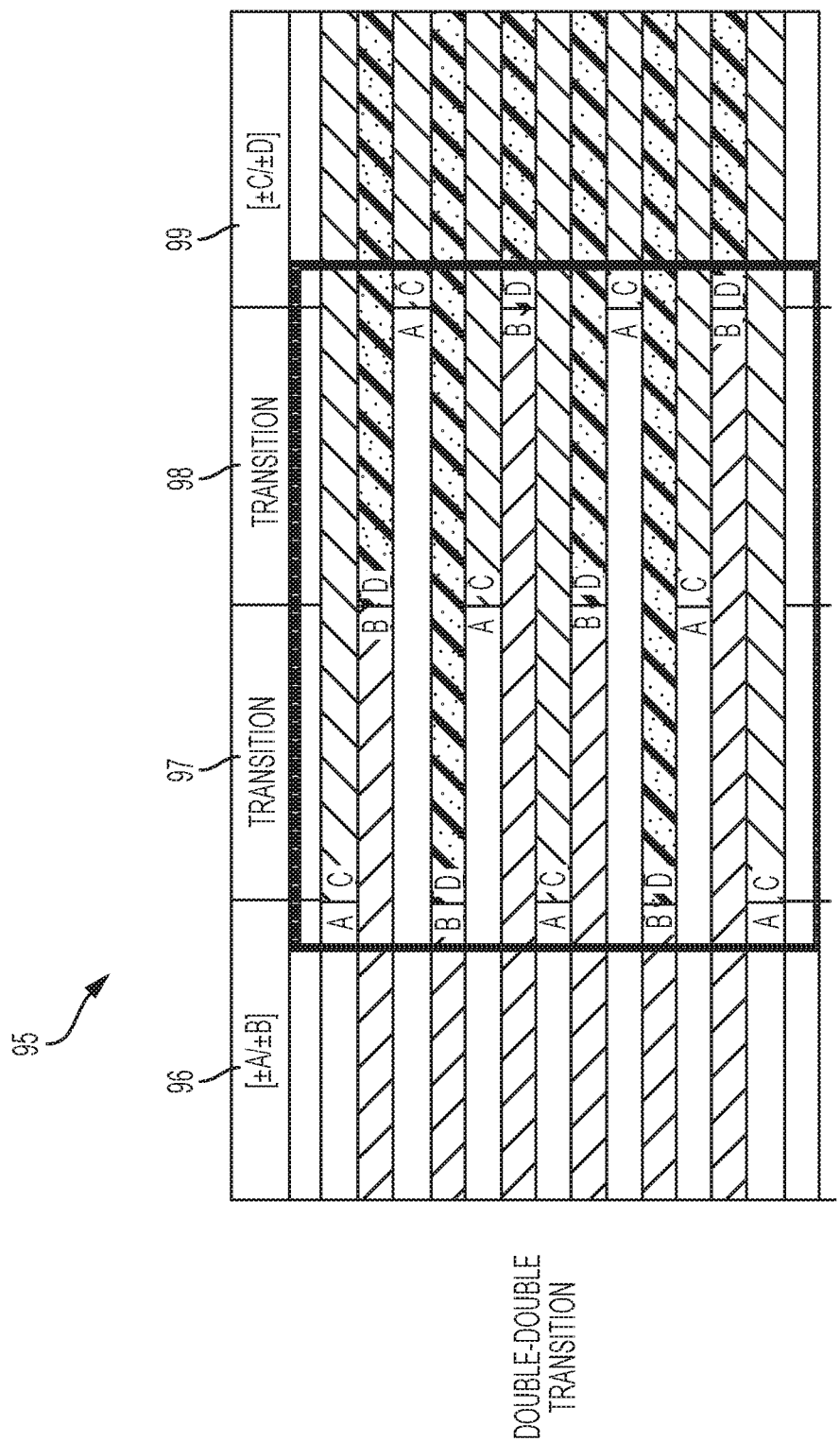
FIG. 6D shows a double-double transition from one double-double sub-laminate to another, whereby all angles within the respective angle sets are changed across an elongated set of transition zones.

Structurally speaking, the homogenized structure 78 is naturally symmetric, which means that stacking can be continuously performed, without any concern over stopping at the mid-plane. Laminates that are homogenized are also more resistant to delamination, have higher strength because cracks may be more localized, and experience minimal if any thermal warpage. Still further ply dropping, tapering, and blending may be easily achieved where homogenization exists. Specifically in the context of the double-double sub-laminates [±Φ/±Ψ], blending between two different laminates (e.g., as between two adjacent elements on a wing structure or the like) may be achieved one helix at a time, as illustrated in FIGS. 6B-D, each described in turn below. Optimization and automated layup is thus easily and efficiently implemented.

With reference specifically to FIG. 6B, non-limiting and exemplary illustrations of beams and wings with homogenization across the thickness thereof are illustrated. In the top material 80, the structure consists of a single ply material or one double helix material (e.g., [±Ψ/]=[±25/]). Within material 80 there are notably no internal discontinuities, thereby improving strength and minimizing delamination issues; ply drops are also conveniently and consistently located in the bottom of the structure. In the middle material 82, there is illustrated a stacking of a double-double helix material (i.e., the double-double sub-laminate as in FIG. 6A) (e.g., [±Φ/±Ψ]=[±25/±65]). Again, ply drops are located consistently along the bottom of the structure and homogenization provides delamination protection and internal strength despite the provision of an alternating angle set [±Φ/±Ψ]. In the bottom material 84, a transition is illustrated as between two zones or two elements, for example two areas on a wing or the like (see by analogy FIG. 2B and the patchwork of element zones on a fuselage). Utilizing here a double-double sub-laminate [±Φ/±Ψ], blending is relatively straightforward, in terms of transitioning to a single helix material [±Φ/]. Specifically, during the transition 86 between zone 2 and zone 1, butt joints 88 are staggered so as to ensure the total laminate retains desired strength and stiffness characteristics.

Notably, conducting such a transition as even in FIG. 6B would prove difficult and complex—and perhaps unworkable—utilizing two legacy quad sub-laminate structures. Many ply layers would be involved, potentially with varying thicknesses as between zones, with different plies being required to remain (i.e., for symmetry and the like) in the [0], [90] and [±45] orientations. Further details in this respect—surrounding the complexities of ply drop and taper—in the context of legacy quad sub-laminate structures may be understood from U.S. Pat. No. 9,296,174, the entire contents of which as are hereby incorporated by reference in their entirety.

Turning now to FIGS. 6C and D, therein illustrated are a single-double-double transition 90 and a double-double-double transition 95, respectively. From a practical perspective, in the transition 90, one angle (i.e., [±A]) remains constant across both sub-laminates 91, 93 throughout the transition; in contrast, in the transition 95, all angles within the double-double sub-laminates 96, 99 change during the course of the transition.

Specifically, utilizing the double-double sub-laminate structures described herein, blending of two different double-double sub-laminates (e.g., for the construction of different zones of a total laminate structure such as a fuselage or a wing) may be done in two distinct ways. The first of these is shown in FIG. 6C, whereby transition of only one double helix occurs at any particular point in time or location. This single transition 92 occurs from [±A/±B] sub-laminate 91 to [±A/±C] sub-laminate 93. Notably, for continuity, the [±A] plies remain constant throughout the transition zone 92. Although not illustrated in FIG. 6C, following arrival at the [±A/±B] sub-laminate, an additional transition may occur, at that point maintaining [±C] constant while changing [±A] to [±D]; the resulting double-double sub-laminate would thereafter be [±D/±C].

The other way to transition—illustrated in FIG. 6D—is more complicated than the procedure in FIG. 6C; however, it comes with the advantage that a much more concise transition zone (and notably a single transition zone) is required. Specifically, in FIG. 6D, a piecemeal transition occurs through sequential zones 97, 98, whereby the transformation occurs from [±A/±B] sub-laminate 96 to [±C/±D] sub-laminate 99. Overlap is provided, whereby half of the [±A/±B] ply layers continue through both transition zones 97, 98; the same is true for half of the [±C/±D] ply layers that are introduced across both transition zones 97, 98. The other half of [±A/±B] and [±C/±D] transition (i.e., have butt joints) at the intersection of transition zone 97 and transition zone 98. In this manner, a blending of the double-double sub-laminates is achieved in a simplistic and straightforward manner. To reiterate, nothing of this nature is achievable via legacy quad sub-laminate configurations due to the various constraints imposed, as detailed elsewhere herein.

Of particular note with reference again to FIGS. 6C and 6D, it should be understood that beyond avoiding the various internal constraints imposed upon legacy quad sub-laminate structures and the difficulties such create during the course of blending procedures, the blending described above for double-double sub-laminates is further facilitated due to the constant thickness of all sub-laminates throughout a double-double laminate structure. Indeed, as detailed elsewhere herein, the double-double sub-laminates are all no more than 4-plies thick. Still further, where stacked sequentially (as in FIG. 6A), due to the paired angle sets [±C/±D] (by way of non-limiting example), the thickness of laminates built from multiple double-double sub-laminate structures are comparable in thickness. Even where not for a particular transition, ply drop remains straightforward given the alternating nature of the [±C/±D] ply angle sets within each sub-laminate structure.

Notably, in the examples cited previously herein, ply drop and ply change (e.g., from ±B to ±C in FIG. 6C) may be done according to various embodiments via a handling of two plies as a single unit. Nevertheless, during possible stacking of double-double, it is possible to separate each ply so spiral and intersperse stacking can be considered. In such cases, transition may be performed in certain embodiments at single ply level, with the discontinuities from angle change being staggered, as they are for each double helix (2 ply) in FIGS. 6C and 6D. The transition zone may thus be widened; however, the general principle of making ply angle changes remain the same. And notably, throughout the thickness of the sub-laminate remains constant.

Exemplary Non-Limiting Applications of Double-Double Sub-Laminates

Various characteristics of double-double sub-laminates have been described previously herein; now below is provided discussion of various non-limiting and exemplary applications utilizing the same, with comparisons made relative to conventional configurations utilized in analogous applications.

1. Grids & Grid/Skin Combinations

The first useful application of double-double sub-laminates lies in the construction of composite grids and/or composite grid and skin structures. Notably, with the material characteristics of—in particular homogenized—double-double sub-laminate structures, implementation of grid and skin type structures is predictable and achievable; it is also made more efficient alongside optimizable and automated layup procedures that in a straightforward manner are able to create total laminates that are not only strong and lightweight, but also damage tolerant and inexpensive.

Figure 7:
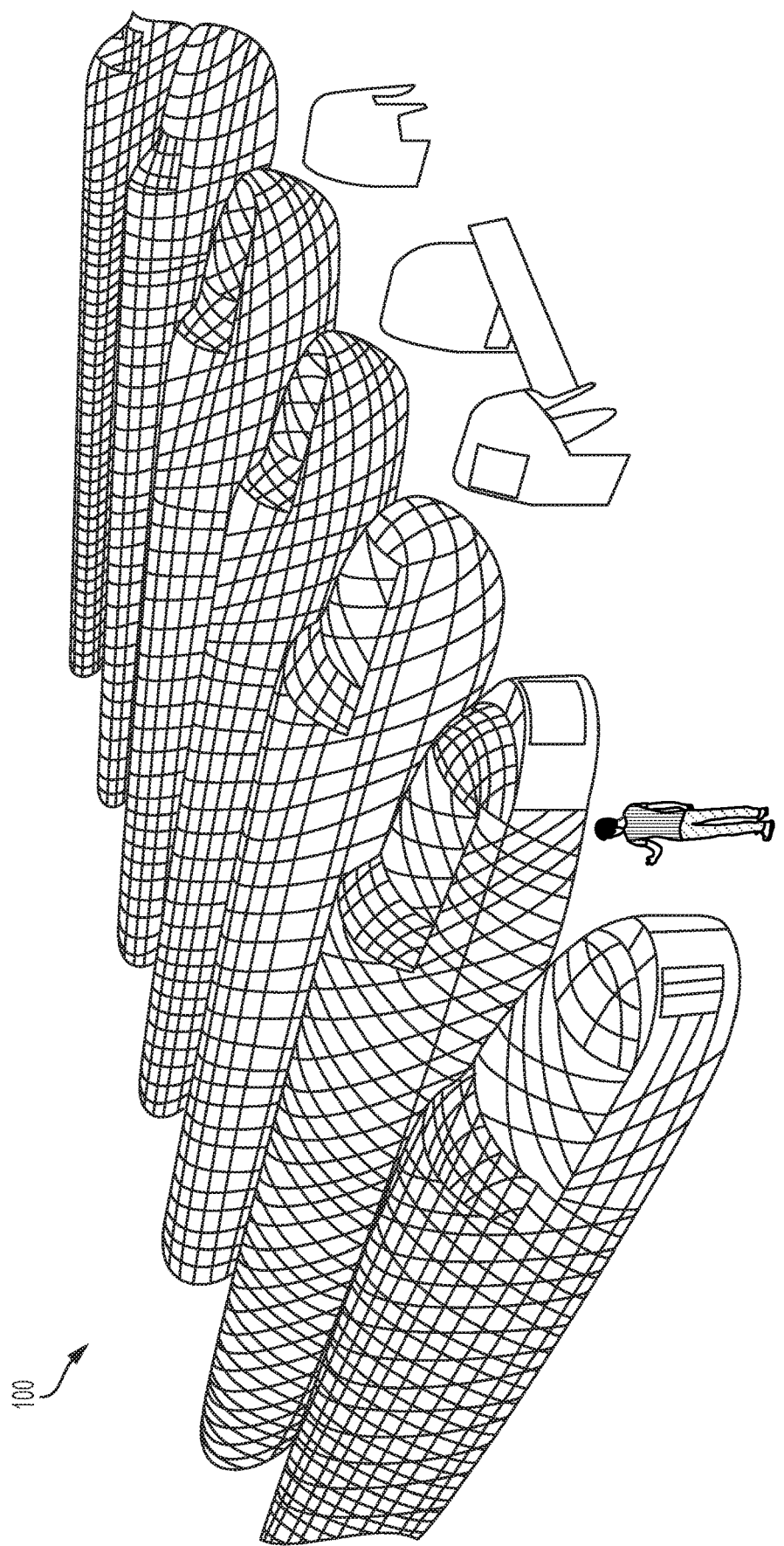
FIG. 7 shows a conventional mesh or grid-like configuration.

Conventional composite grid structures—typically multi-directional in nature—are generally designed to emulate the strength characteristics of conventional metal-based structural materials, and as such have been typically constrained to designs utilizing more than two ply layers or components. One such example, the Wellington fuselage 100 is illustrated in FIG. 7, wherein the grid thereof was made of aluminum and had a [±45] grid with a nominal [0] tie. One of the most important feature of composite grids is the inherent damage tolerance. As one rib or joint is removed by external force or impact, the lattice structure with high density of intersection ribs will form a new network with little loss in the integrity of the entire grid structure. The survival of the Wellington bomber fuselage (see again FIG. 7) after battle damage is also a true testimony of this inherent damage tolerance. Notably, traditional laminates (skins without grids) are penalized by at least a factor of 2 for damage tolerance to guard against growth of micro cracking and delamination. Having grids as the backbone of a grid/skin construction is thus a game changing concept that permits fuller use of the intrinsic properties of composite materials.

Recent advances in technology have also identified composite grids as providing an exceptionally light weight configuration and/or alternative to configurations such as those utilized in the Wellington fuselage. For example, unidirectional ribs can replace aluminum tri-ax grids. Still further, any of a variety of angles—both for the grid and the tie (or skin layer)—may be utilized where double-double sub-laminate structures are relied upon. This may be understood first with reference to FIG. 8A, wherein two embodiments are illustrated, namely a single skin grid structure 110 and a double skin grid structure 120. One double helix or sub-laminate [±A] is used to form the skin 111 layer, while another double helix or sub-laminate [±B] is used to form the grid 112 components. In this manner a single double-double sub-laminate [±A/±B] may be utilized for any particular skin/grid combination. In certain embodiments, cross-laying of the sub-laminate [±B] achieves the multi-directional (i.e., diamond-like) pattern of the grid and the density thereof may vary according to various embodiments (see also FIG. 8B). The rib cross-section can be designed to have many variations in width and depth, and can follow, for example, a cosine power law to further reduce weight. Such drastic taper from root to tip can be a huge design option. The knots (i.e. the intersection of ribs) are most likely to be the weak points in the grid. Special considerations, such as double intersection of plies or tows, instead of triple intersections, and widening the root area of the knot, will help strengthen the knots.

Figure 8A:
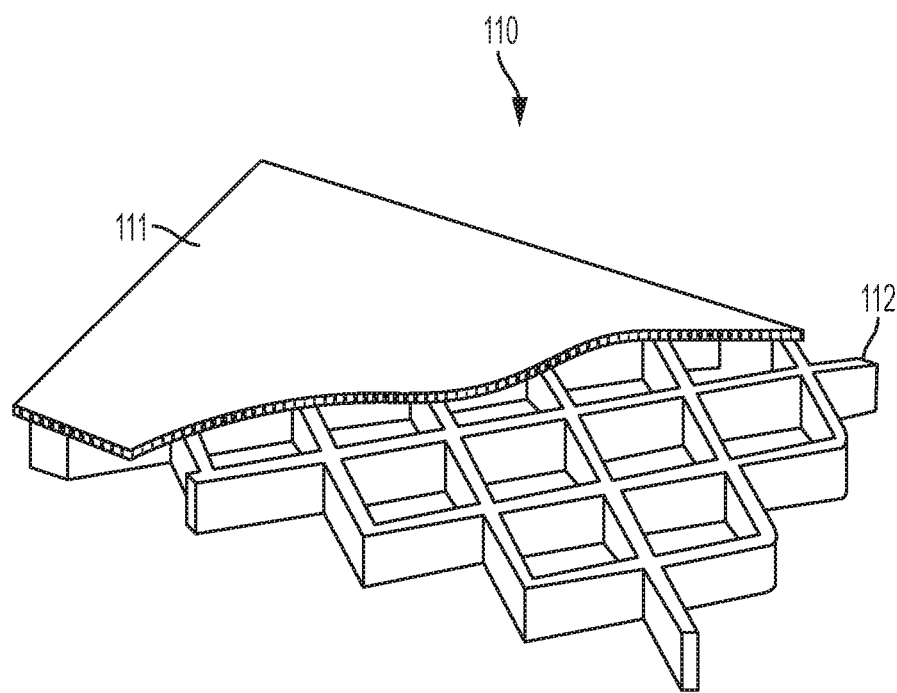
FIG. 8A shows a series of grid and skin constructions formed from double-double sub-laminate material.
Figure 8A:
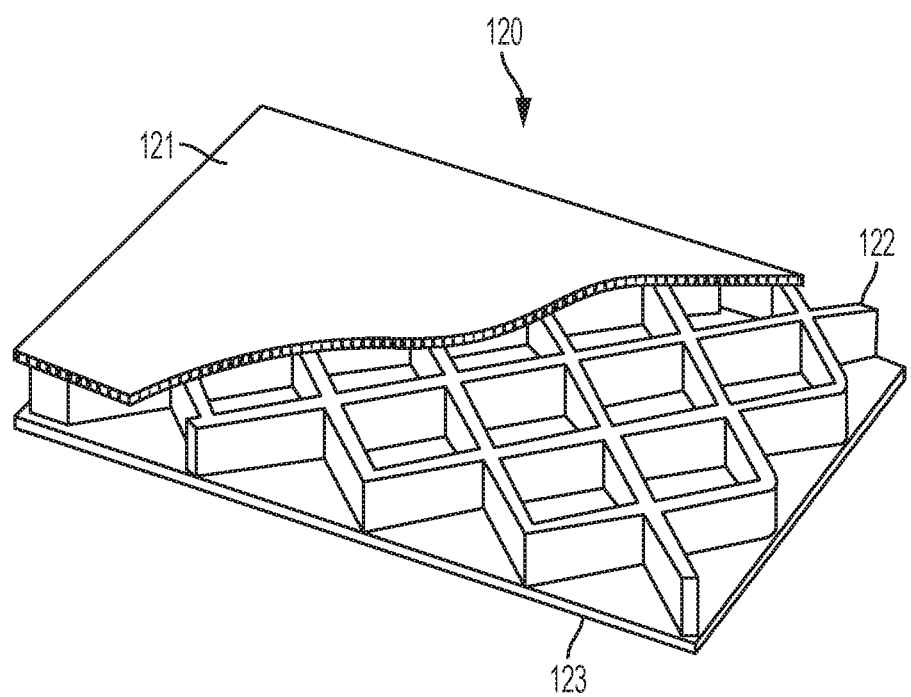

By way of comparison to the single skin grid structure 110, reference is made to the double skin grid structure 120, also in FIG. 8A. Therein, one double helix or sub-laminate [±A] is used to form each of the skin layers 121, 123, while another double helix or sub-laminate [±B] is used to form the grid 122 components. In this manner a single double-double sub-laminate [±A/±B] may be utilized for any particular double skin/grid combination, provided both skins are oriented in the same manner, as detailed elsewhere herein. In certain embodiments, cross-laying of the sub-laminate [±B] may again achieve the multi-directional (i.e., diamond-like) pattern of the grid and the density thereof may vary according to various embodiments (see also FIG. 8B).

As mentioned, grid is a unique structure, at least due to its ability to have unidirectional composite form its ribs. Thus, the stiffness of a grid with such ribs is many times stiffer than a grid made—for example—of aluminum. The reason for that is the ribs of an aluminum grid is the same aluminum stiffness at 70 GPa. For carbon composites, the rib stiffness can easily be 180 GPa. Still further, composite materials are generally 40 percent lighter than aluminum. Thus, together with higher stiffness and nearly one half the weight, a composite grid—formed by example from double-double sub-laminate material—may have 4 or 5 times the specific stiffness, as compared to conventional grid structures.

The strength of composite grid structures defined with double-double sub-laminate materials also surpass that of aluminum grid by even a wider margin than stiffness. Thus the well-known resistance to explosion of the Wellington bomber (see again FIG. 7) may be enhanced via utilization of the double-double sub-laminate materials, with greater anticipated effectiveness for—as a non-limiting example—fuselages of airplanes.

2. Automated Layup Considerations

Figure 8B:
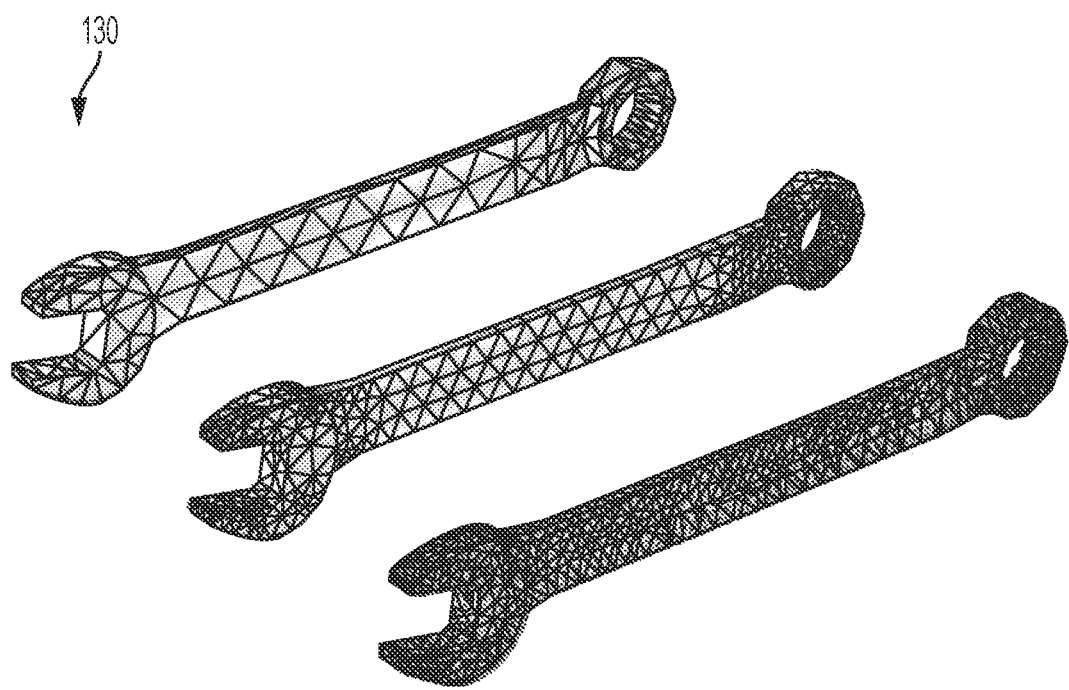
FIG. 8B shows a series of traditional mesh or grid-like configurations.
Figure 8C:
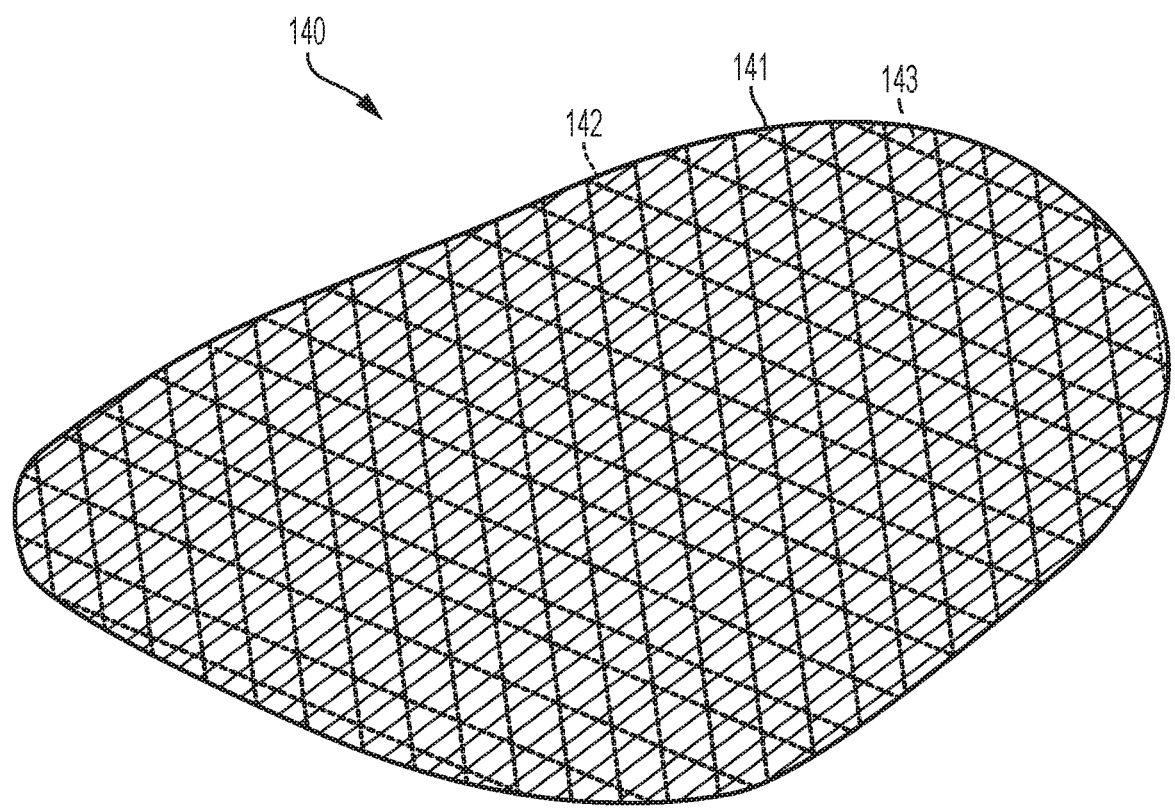
FIG. 8C shows a planar double helix grid and skin structure.

Turning now with focus upon FIGS. 8B and 8C, conventional and exemplary meshes 130 for finite element analysis are illustrated in FIG. 8B. The shapes of such meshes are often determined by the shape of the object to be analyzed. Depending upon the density of the mesh 130 (ever increasing from left to right in FIG. 8B), stress areas may exist where the object formed (e.g., a wrench) may be weaker than in other areas thereof. This is due to the manner in which the mesh is generated and applied in a manner so as to suit the composite structure being formed. Stated otherwise, where complex three-dimensional structures are involved, meshes therefor—and in particular the angle sets therein—may suffer and/or alter during the course of layup, so as to ensure adherence of the sub-laminate materials properly. What is overlooked, though, via such conventional procedures, is the layup or stacking process when the composite structures are actually fabricated, so as to ensure consistency remains in the angle sets provided. Indeed, as detailed elsewhere herein, it should be understood that any changes in angle sets during the course of layup or stacking will result in a corresponding change in material characteristics of the mesh and thus for the formed product; unforeseen failures may thus occur.

With utilization of double-double sub-laminates, though, straight-line meshes are conceptually straightforward to generate, as illustrated in FIG. 8C. As a result, the layup of tape or fabric (or even grid/skin combinations) can go from one end of a structure to the opposite end without stopping, cutting, or experience local tape buckling. Conventional legacy quad sub-laminates simply cannot achieve such smooth paths, due at least in part to the internal constraints placed thereon, including maintaining of certain plies at particular angles throughout. With this context, FIG. 8C illustrates a double-double helix sub-laminate pattern for the double-double-formed total laminate 140. The grid-based component 142 is the first double helix in [±Φ], and one of the linear components 143 is of the second double helix in [±Ψ]. In certain embodiments, a perimeter mesh component 141 may also be defined, although not necessary. In this manner, though a straight-line mesh (i.e., grid component 142+linear component 143, formed from a single double-double sub-laminate module [±Φ/±Ψ] is possible to achieve, with the added benefit (beyond the thinness of double-double sub-laminates) of seamless coverage surface of any complex curvatures. Stated otherwise, regardless of the curvature of a particular total laminate surface or the like, the path for each double helix can travel from one edge to the other without cutting or edge buckling. The path is determined by an innovative projection from a flat plane (as seen in FIG. 8C), and unique with double-double patterns (i.e., this simplicity is not possible with tri-axial grid, legacy quad sub-laminate structures, or the like).

Figure 11:
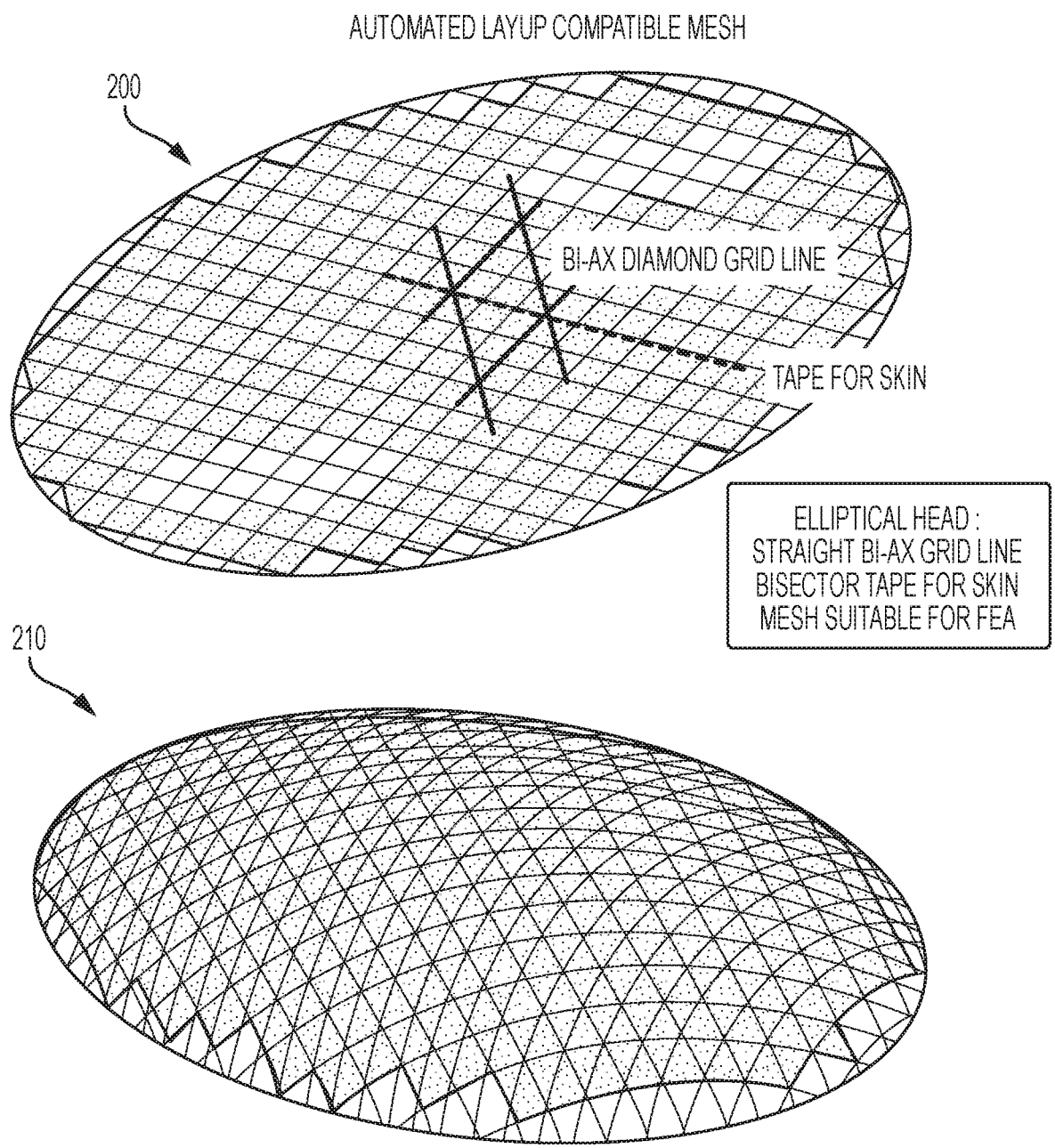
FIG. 11 shows an automated layup compatible mesh, including a planar and a three-dimensionally projected version thereof, as achievable in conjunction with double-double sub-laminates.
Figure 12:
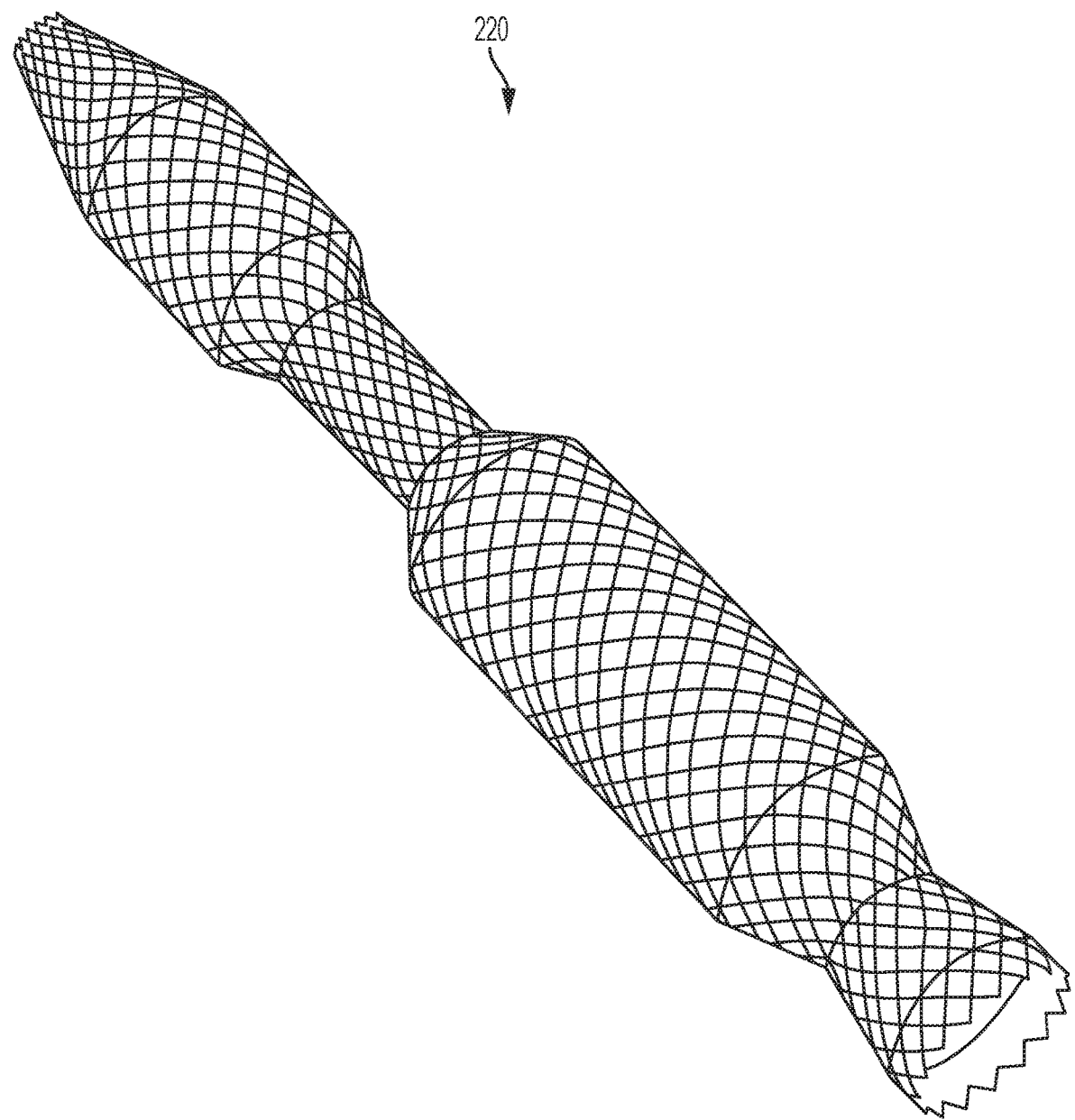
FIG. 12 shows application of double-double sub-laminate grid mesh to a rocket-type structure having multiple complex and changing three-dimensional surfaces.
Figure 13A:
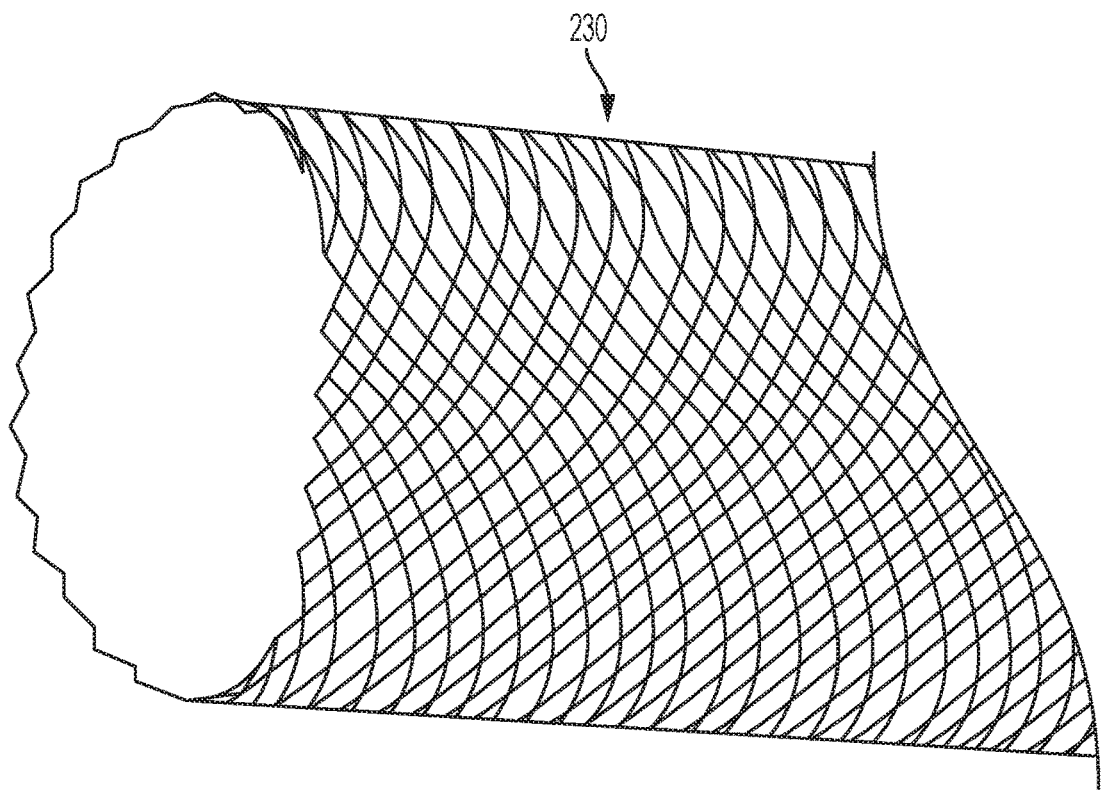
FIGS. 13A-B show application of double-double sub-laminate grid and/or grid/skin mesh to a fuselage, on both the cylindrical and conical surfaces thereof.
Figure 13B:
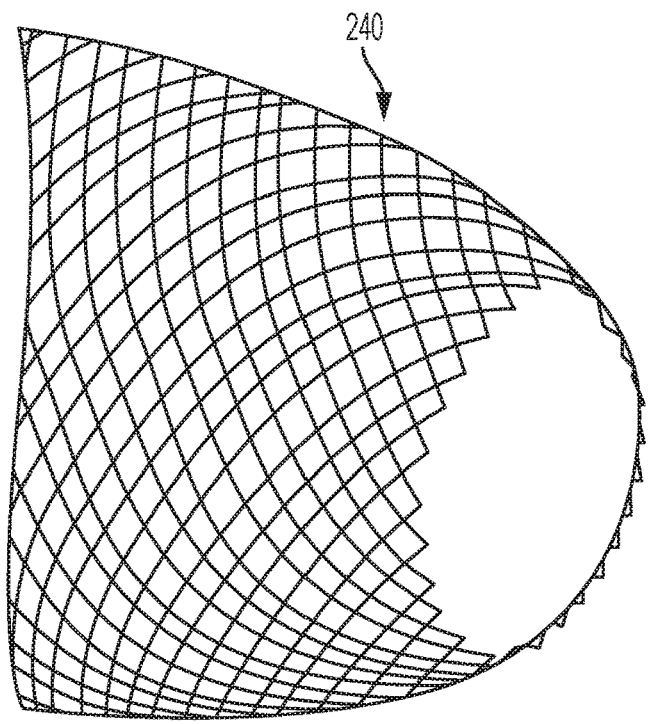

The projection from the flat plane of FIG. 8C may be seen with reference also to the flat plane 200 illustrated in FIG. 11, wherein an analogous total laminate is provided. Again, a bi-axial diamond grid may be defined by the first double helix in [±Φ], while the linear or tape component for skin is the second double helix in [±Ψ]. Provision of the flat plane embodiment 200 of the total laminate may be projected into the three-dimensional curvature 210 shown in the bottom-right of FIG. 11. Application of this projection may be seen also in FIG. 12 (showing a single double-double sub-laminate defining the complex three-dimensional and changing shapes and contours of a rocket body 220); in FIG. 13A (showing a single double-double sub-laminate defining cylindrical shapes of—for example—a fuselage body 230); and in FIG. 13B (showing a single double-double sub-laminate defining conical transitioning coverage at—for example—one end of a fuselage body 240).

Figure 9:
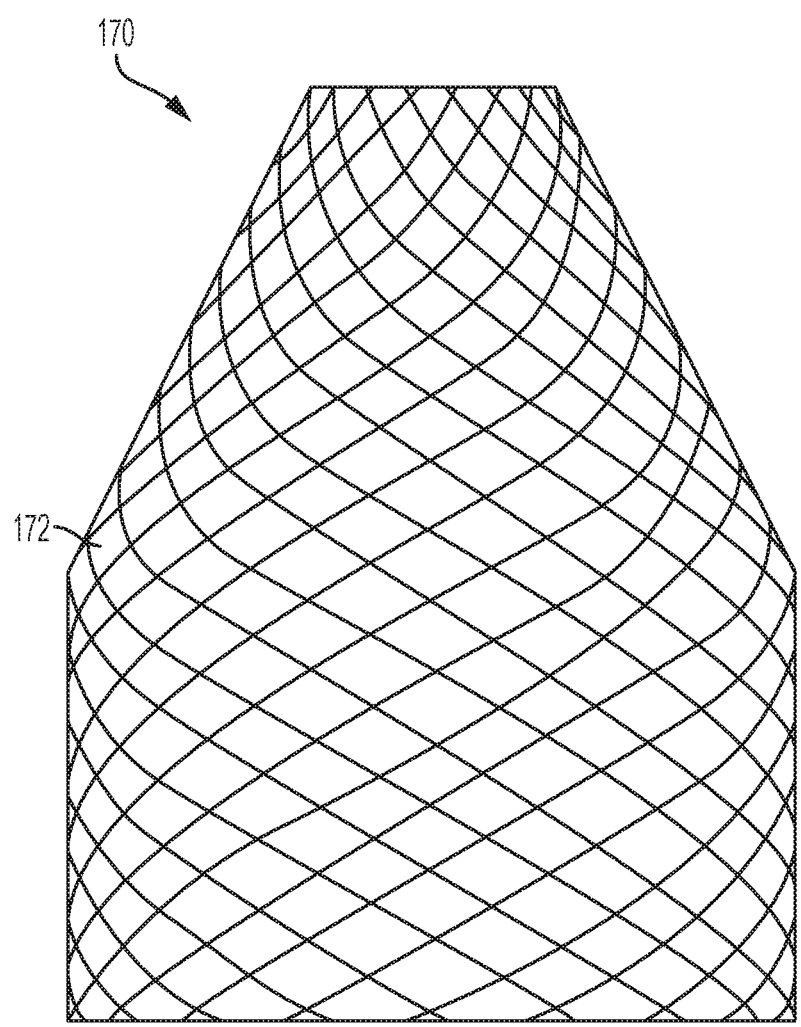
FIG. 9 shows a double helix grid structure for utilization in conjunction with the structure of FIG. 8C.
Figure 10:
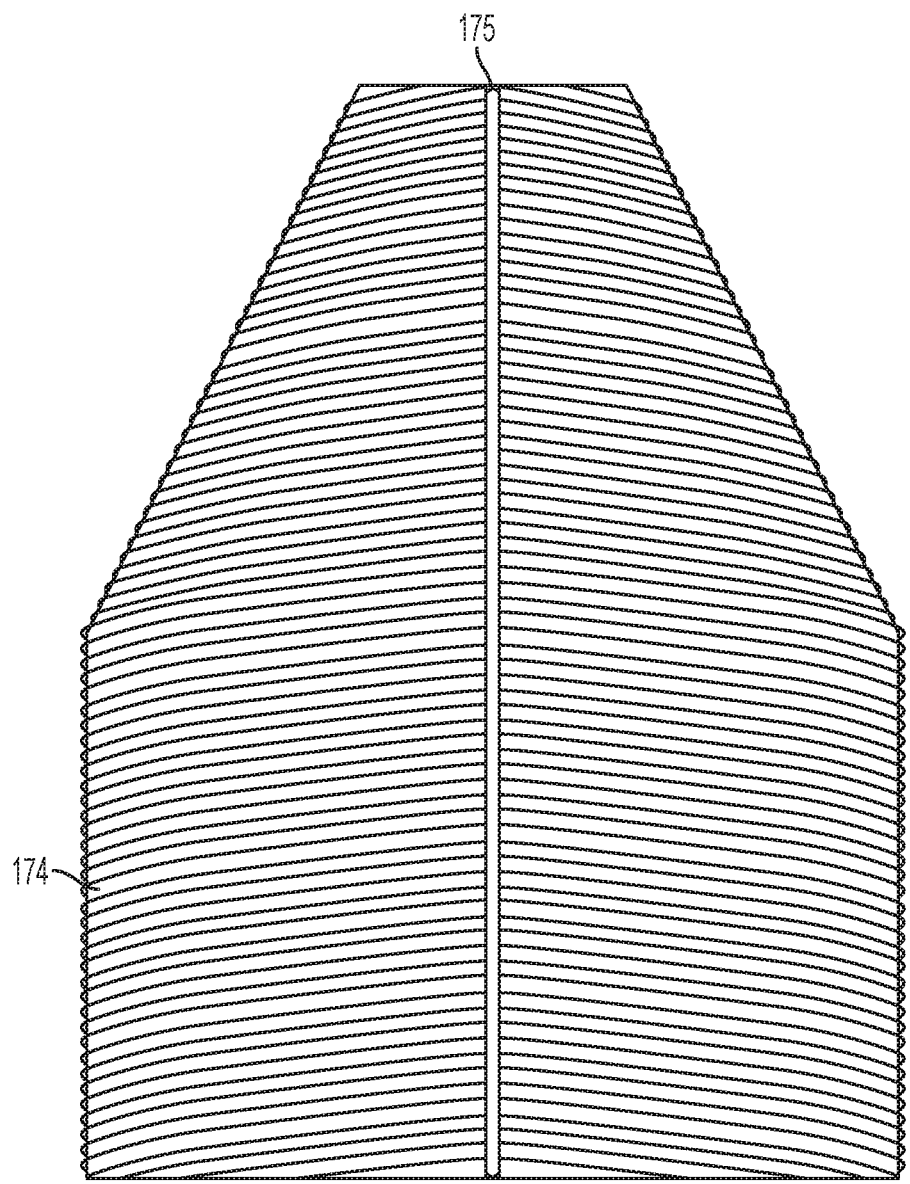
FIG. 10 shows a double helix skin path for utilization in conjunction with the grid structure of FIG. 9, to collectively define a double-double sub-laminate formed grid and skin structure.

Details in this respect may also be understood from the enlarged views of FIGS. 9 and 10. As shown elsewhere (see FIG. 13B and also FIG. 12), as the diameter of a cylindrical shell changes, the straight-line procedure detailed herein can continue, with the only caveat being that the enclosed angle of the mesh will have to change. This may be best understood with reference to FIG. 9, wherein the mesh 170 on the cylinder, while laid up continuously in a straight-line manner, experiences a change in its enclosed angle in region 172, namely where the diameter begins to change Manufacturability of laminates to cover such surfaces are enhanced particularly by double-double laminated structure because, as detailed elsewhere herein, the layup paths are straight.

This is made possible, as mentioned elsewhere herein, by a unique mesh generation technique through a projection from a straight lines mesh on to any curved surface. The legacy quad layup is not amenable to such projection because the ply angles are fixed in 0, 90, and ±45. Only double-double family can meet this straight-line layup opportunity. This automated layup compatible mesh can be generated for double-double laminates seamlessly, or the grid/skin construction (see FIGS. 8A-C), defined by one double helix pattern as the grid, and the other double helix pattern as the skin, may be utilized. This may be best understood by viewing a combination of FIGS. 9 and 10, wherein the grid pattern appears as a mesh 170 on the cylinder in FIG. 9, and the skin pattern 174 appears in FIG. 10. In certain embodiments, layup of the skin 174 may occur at two angles about a mid-point 175 or otherwise.

The sharing of the same mesh for analysis, design, manufacturing, maintenance and repair is also new. The present practice is to have one mesh in analysis, and another mesh for automated layup. Such practice can deny many design features not realized in the component built in accordance to a different mesh than that modeled (i.e., material characteristics may suffer and lead to unforeseen failures and/or materials may be over-designed and incorporate needless weight and/or strength characteristics for a specific application). Blending, taper, ply drops, patches, and other critical decisions made by analysts and designers may also be compromised by manufacturing using a different mesh than that modeled with, at least because many of the features simply cannot be manufactured. Via incorporation of double-double sub-laminates, though, using the same manufacturable mesh throughout, which contains features driven by analysis and design, provides a degree of accuracy and consistency that carries into manufacture of the total laminate or composite laminate structure. Amongst other advantages, this more efficient transition from design to finished product can be expected, saving time and money.

As a non-limiting example, for a fuselage, a one-piece structure, cured outside autoclave, with no fasteners, and resistant to explosion are all possible. This would begin with accepting double-double sub-laminates as a replacement to legacy quad or comparable conventional sub-laminates in sub-laminate and/or grid/skin selections. Upon selection of optimized double-double sub-laminates, use of straight line mesh can provide automated layup. Still further, ply drop, tapering, and the like may be significantly simplified, as detailed herein. As a result, instead of a complete circumferential piece for the fuselage, there can be multiple longitudinal pie-shaped segments bound together by all-hoop winding. Such segments will include integral floor and partitions in the passenger and baggage compartments. Such integrated internal structure can further strengthen the fuselage. As other non-limiting examples, for rockets and other pressure vessels, grid/skin structure can also be manufactured in as one-piece continuous laminate structures, even where variable diameters are involved.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A composite laminate structure comprising:
a plurality of sub-laminate modules each comprising:
a first ply set consisting of a first ply layer oriented at a first angle and a second ply layer oriented at a second angle, the second angle being equal and opposite the first angle;
a second ply set consisting of a third ply layer oriented at a third angle and a fourth ply layer oriented at a fourth angle, the fourth angle being equal and opposite the third angle; and
an acute angle defined by a difference between the first angle and the third angle,
wherein the second ply layer is positioned adjacent the third ply layer and the second and third ply layers are both positioned intermediate the first and fourth ply layers, thereby defining a double-double helix arrangement of the respective ply layers,
wherein the plurality of sub-laminate modules are sequentially stacked relative to one another so as to define a homogenized composite laminate structure.

2. The composite laminate structure of claim 1, wherein:
the plurality of sub-laminate modules comprise at least a first sub-laminate module and a second sub-laminate module each positioned in a single plane;
the first, second, third, and fourth angles of the first sub-laminate module are all different than the first, second, third, and fourth angles of the second sub-laminate module; and
the composite laminate structure includes:
a first zone consisting of the ply layers of the first sub-laminate module;
a second zone consisting of the ply layers of the second sub-laminate module; and
a transition zone intermediate the first and second zones and within the single plane, the transition zone comprising a mixture of a portion of the ply layers of both the first and second sub-laminate modules.

3. The composite laminate structure of claim 2, wherein:
the first and second angles of the first and second sub-laminate modules are each between ±10° and ±45°;
the third and fourth angles of the first and second sub-laminate modules are each between ±55° and ±80°;
the first and second angles of the first sub-laminate module are different from the first and second angles of the second sub-laminate module; and
the third and fourth angles of the first sub-laminate module are different from the third and fourth angles of the second sub-laminate module.

4. The composite laminate structure of claim 1, wherein:
the plurality of sub-laminate modules comprise at least a first sub-laminate module and a second sub-laminate module each positioned in a single plane;
the first, second, third, and fourth angles of the first sub-laminate module are all different than the first, second, third, and fourth angles of the second sub-laminate module; and
the composite laminate structure includes:
a first zone consisting of the ply layers of the first sub-laminate module;
a second zone consisting of the ply layers of the second sub-laminate module;
a first transition zone intermediate the first zone and a second transition zone and within the single plane, the first transition zone comprising a first mixture of a portion of the ply layers of both the first and second sub-laminate modules; and
a second transition zone intermediate the second zone and the first transition zone and within the single plane, the second transition zone comprising a second mixture of a portion of the ply layers of both the first and second sub-laminate modules, the second mixture being different than the first mixture.

5. The composite laminate structure of claim 1, wherein:
the plurality of sub-laminate modules comprise at least a first sub-laminate module and a second sub-laminate module each positioned in a single plane;
the first and second angles of the first sub-laminate module are the same as the first and second angles of the second sub-laminate module;
the third and fourth angles of the first sub-laminate module are all different than the third and fourth angles of the second sub-laminate module; and
the composite laminate structure includes:
a first zone consisting of the ply layers of the first sub-laminate module;
a second zone consisting of the ply layers of the second sub-laminate module; and
a transition zone intermediate the first and second zones and within the single plane, the transition zone comprising a mixture of a portion of the ply layers of both the first and second sub-laminate modules.

6. The composite laminate structure of claim 1, wherein the acute angle is either less than 5° or more than 85°.

7. The composite laminate structure of claim 1, wherein:
the first and second angles of at least one of the plurality of sub-laminate modules are between ±10° and ±45°; and
the third and fourth angles of at least one of the plurality of sub-laminate modules are between ±55° and ±80°.

8. The composite laminate structure of claim 1, wherein:
the first and second angles of at least one of the plurality of sub-laminate modules are one of: ±32°, ±13°, or ±22.5°; and
the third and fourth angles of at least one of the plurality of sub-laminate modules are one of: ±58°, ±73°, or ±67.5°.

9. The composite laminate structure of claim 1, wherein fibers of the first and second ply sets of at least one of the plurality of sub-laminate modules comprise carbon fibers.

10. A composite laminate structure, the composite laminate structure comprising:
a grid component comprising a first ply set consisting of a first ply layer oriented at a first angle and a second ply layer oriented at a second angle, the second angle being equal and opposite the first angle so as to define a diamond-shaped grid structure;
a skin component comprising a second ply set consisting of a third ply layer oriented at a third angle and a fourth ply layer oriented at a fourth angle, the fourth angle being equal and opposite the third angle,
wherein the skin component and the grid component are positioned adjacent one another, such that the third and fourth angles of the skin component are both different from the first and the second angles of the grid component.

11. The composite laminate structure of claim 10, wherein the skin component and the grid component are positioned in parallel and adjacent planar planes.

12. The composite laminate structure of claim 10, wherein the skin component and the grid component are positioned in parallel and adjacent contoured planes, such that the skin and grid components conform to a three-dimensional surface model.

13. The composite laminate structure of claim 10, wherein:
the first and second angles of each of the grid components are between ±10° and ±45°; and
the third and fourth angles of the skin component are between ±55° and ±80°.

14. The composite laminate structure of claim 10, the third and fourth angles of the skin component are both different from and not exactly equal and opposite relative to the first and the second angles of the grid component.

15. A composite laminate structure comprising:
a plurality of sub-laminate modules each comprising:
a first ply set containing a first ply layer oriented at a first angle and a second ply layer oriented at a second angle, the second angle being equal and opposite the first angle;
a second ply set containing a third ply layer oriented at a third angle and a fourth ply layer oriented at a fourth angle, the fourth angle being equal and opposite the third angle;
a first acute angle defined by a difference between the first angle and the third angle; and
a second acute angle defined by a difference between the second angle and the fourth angle,
wherein:
the second ply layer is positioned adjacent the third ply layer and the second and third ply layers are both positioned intermediate the first and fourth ply layers, thereby defining a double-double helix arrangement of the respective ply layers,
the plurality of sub-laminate modules are sequentially stacked relative to one another so as to define a homogenized composite laminate structure,
the first and second angles of at least one of the plurality of sub-laminate modules are one of: ±32°, ±13°, or ±22.5°, and
the third and fourth angles of at least one of the plurality of sub-laminate modules are one of: ±58°, ±73°, or ±67.5°.

16. A method of manufacturing a sub-laminate module for use in forming a composite laminate structure, the method comprising the steps of:
positioning a first ply set in a first orientation, the first ply set consisting of a first ply layer oriented at a first angle and a second ply layer oriented at a second angle, the second angle being equal and opposite the first angle;
positioning a second ply set in a second orientation different from the first orientation, the second ply set consisting of a third ply layer oriented at a third angle and a fourth ply layer oriented at a fourth angle, the fourth angle being equal and opposite the third angle, a difference between the third angle and the first angle defining an acute angle there-between; and
stacking the second ply set adjacent the first ply set so as to define a double-double helix arrangement of the respective layers,
wherein, when stacked, the second ply layer is positioned adjacent the third ply layer and the second and third ply layers are both positioned intermediate the first and fourth ply layers.

17. The method of claim 16, further comprising, prior to the positioning steps, the steps of:
selecting the first angle and the second angle of the first ply set from a continuous field of available angle sets between ±0° and ±90°; and
selecting the third angle and the fourth angle of the second ply set from the continuous field of the available angle sets,
wherein the first and second angles are both different from the third and fourth angles and selected so as to optimize a stiffness of the four ply layer sub-laminate module.

18. A method of manufacturing a composite laminate structure, said method comprising the step of sequentially stacking a plurality of the sub-laminate modules relative to each other, wherein each of the plurality of sub-laminate modules is a sub-laminate module manufactured according to the method of claim 16.

19. A method of manufacturing a composite laminated grid and skin containing structure from a plurality of the sub-laminate modules of claim 16, said method comprising the steps of:
positioning the first ply set of at least one of the plurality of sub-laminate modules in the first orientation, such that the first orientation of the first ply set defines a cross-grid component;
positioning at least one second ply set of the one of the plurality of sub-laminate modules in the second orientation different from the first orientation, so as to define a first skin component;
stacking the first skin component adjacent a first surface of the cross-grid component such that, when stacked, the fourth ply layer is adjacent a portion of both the first and second ply layers.

20. The method of claim 19, wherein:
the at least one second ply set includes two distinct second ply sets; and
the method further comprises the steps of:
positioning a second of the two distinct second ply sets in the second orientation different from the first orientation, the second ply set containing a fifth ply layer oriented at the third angle and a sixth ply layer oriented at the fourth angle, so as to define a second skin component; and
stacking the second skin component adjacent a second surface of the cross-grid component, the second surface being opposite the first surface.

* * * * *